United States Patent
Sakamoto

(10) Patent No.: US 7,728,762 B2
(45) Date of Patent: Jun. 1, 2010

(54) METHOD FOR DETECTING INTERFERENCE IN RADAR SYSTEM AND RADAR USING THE SAME

(75) Inventor: Mai Sakamoto, Kounan (JP)

(73) Assignee: Denso Corporation, Kariya (JP)

( * ) Notice: Subject to any disclaimer, the term of this patent is extended or adjusted under 35 U.S.C. 154(b) by 117 days.

(21) Appl. No.: 12/077,707

(22) Filed: Mar. 20, 2008

(65) Prior Publication Data

US 2008/0231497 A1   Sep. 25, 2008

(30) Foreign Application Priority Data

Mar. 20, 2007   (JP)   ............... 2007-072873

(51) Int. Cl.
  *G01S 13/00* (2006.01)
  *G01S 13/58* (2006.01)
  *G01S 13/93* (2006.01)
(52) U.S. Cl. .................. 342/70; 342/109; 342/159
(58) Field of Classification Search .............. 342/70
  See application file for complete search history.

(56) References Cited

U.S. PATENT DOCUMENTS

| | | | | |
|---|---|---|---|---|
| 5,280,288 A | * | 1/1994 | Sherry et al. | 342/83 |
| 5,751,240 A | | 5/1998 | Fujita et al. | |
| 6,121,918 A | * | 9/2000 | Tullsson | 342/159 |
| 6,894,641 B2 | * | 5/2005 | Uehara et al. | 342/173 |
| 7,187,321 B2 | | 3/2007 | Watanabe et al. | |
| 7,339,518 B2 | * | 3/2008 | Natsume et al. | 342/70 |
| 7,403,153 B2 | * | 7/2008 | Kelly et al. | 342/159 |
| 7,450,056 B2 | * | 11/2008 | Shirakawa et al. | 342/159 |
| 7,522,092 B2 | * | 4/2009 | Okai et al. | 342/70 |
| 2007/0040731 A1 | * | 2/2007 | Kishida | 342/109 |
| 2007/0120731 A1 | * | 5/2007 | Kelly et al. | 342/159 |
| 2007/0171122 A1 | * | 7/2007 | Nakano et al. | 342/91 |
| 2008/0218406 A1 | * | 9/2008 | Nakanishi | 342/192 |

FOREIGN PATENT DOCUMENTS

| | | |
|---|---|---|
| JP | 58-37576 | 3/1983 |
| JP | 62-187272 | 8/1987 |
| JP | 02-290582 | 11/1990 |
| JP | 09-222474 | 8/1997 |
| JP | 2002-168947 | 6/2002 |
| JP | 2004-239720 | 8/2004 |
| JP | 2006-300550 | 11/2006 |

OTHER PUBLICATIONS

Office action dated Nov. 18, 2008 in Japanese Application No. 2007-072873.
R.O. Schmidt, "Multiple Emitter Location and Signal Parameter Estimation", IEEE Transactions on Antennas and Propagation, vol. AP-34, No. 3, Mar. 1986, pp. 276-280.

* cited by examiner

*Primary Examiner*—Thomas H Tarcza
*Assistant Examiner*—Matthew M Barker
(74) *Attorney, Agent, or Firm*—Harness, Dickey & Pierce, PLC

(57) ABSTRACT

A method for detecting an occurrence of interference between a return of a radar wave which has been transmitted by a radar and has an oscillating amplitude in time and a radio wave transmitted by some other radar, Includes steps of: detecting extremal points of an incident radio wave in which the radio wave transmitted by the other radar is superposed on the return of the radar wave, extracting, sequentially in time, an emerging pattern of the extremal points of the incident radio wave within each of periods of time to obtain a series of emerging patterns of the extremal points, detecting a period during which the emerging pattern of the extremal points is irregular among the series of the emerging patterns of the extremal points, and determining that the interference occurs during the detected period of time.

8 Claims, 12 Drawing Sheets

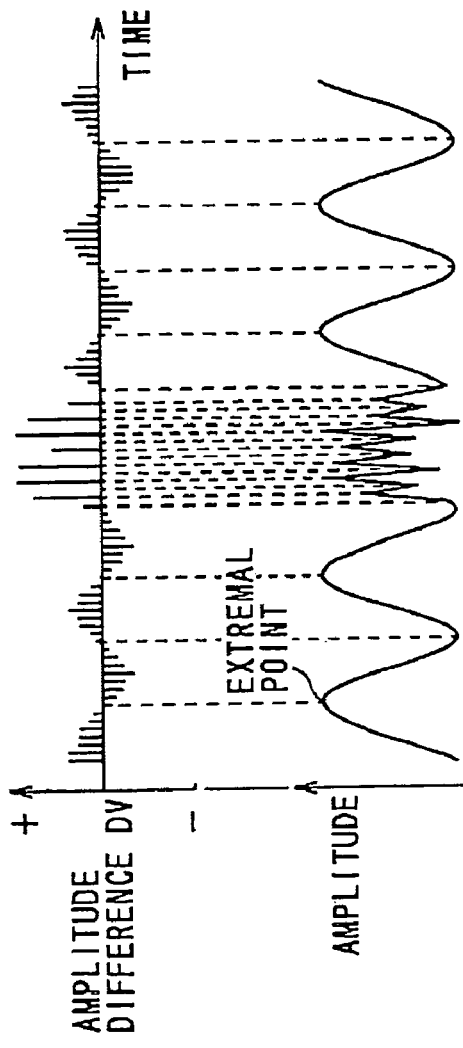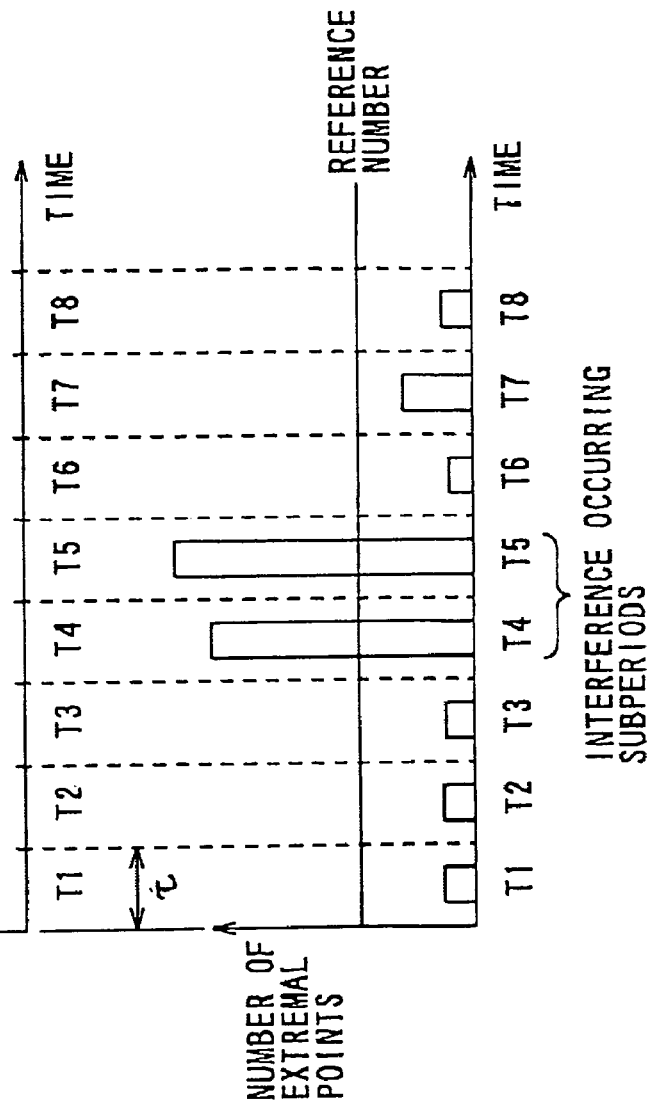

METHOD FOR DETECTING INTERFERENCE IN RADAR SYSTEM AND RADAR USING THE SAME

CROSS REFERENCE TO RELATED APPLICATION

The present application relates to and incorporates by reference Japanese Patent Applications 2007-72873 filed on Mar. 20, 2007.

BACKGROUND OF THE INVENTION

1. The Field of the Invention

The present invention relates to a method for a radar for detecting interference between the radar and some other radar. The present invention further relates to an interference detecting device for a frequency modulated continuous wave (FMCW) radar and to the FMCW radar equipped with the interference detecting device using the method for detecting interference between the radar and some other radar.

2. Description of the Prior Art

A number of automotive radar systems which are suited to vehicle safety systems, for example, crash protection systems that minimize the effects of an accident, reversing warning systems that warn the driver that the vehicle is about to back into an object such as a child or another vehicle and the like, are known. Hence, it is important for these automotive radar systems to provide the driver with some information as to the nature or location of a target object. One target characteristic of great importance is the distance from the radar to the target object (the downrange distance). In particular, if there are multiple target objects, distances to those target objects are important information for the driver. Thus, it is obvious that radars that provide accurate downrange information for multiple target objects are desired.

The simplest automotive radar systems use a continuous wave (CW) radar in which a transmitter continuously transmits electromagnetic energy at a single frequency. The transmitted electromagnetic energy is reflected by a target object and received by the radar receiver. The received signal is shifted due to Doppler effect by movement of the target object relative to the radar. The CW receiver filters out any returns without a Doppler shift, i.e., targets which are not moving with respect to the radar. When the receiver detects the presence of a Doppler shifted signal, the receiver sends a notification containing information about presence of the target object.

Another type of radar is a two-frequency CW radar. The two-frequency CW radar transmits electromagnetic energy at a first frequency and a second frequency. The transmitted energy is reflected by a target object and received by a two-frequency receiver. The receiver measures the difference between the phase of the signal received at the first frequency and the phase of the signal received at the second frequency. The distance to the target object can be calculated from the measured phase difference. Unfortunately, the two-frequency CW radar performs poorly when there are multiple target objects at different ranges, and thus the range measurement obtained from a two-frequency CW radar in the presence of multiple target objects unreliable.

There have been known FMCW radars used as vehicle-mounted radars to detect the presence of target object or obstacles, distance to a preceding vehicle, and relative speed of the preceding vehicle from the vehicle equipped with the FMCW radar.

In order to detect target characteristic such as presence of a preceding vehicle, downrange distance to the preceding vehicle, and relative speed of the preceding vehicle, the FMCW radar transmits a radar wave via a directional antenna unit. The frequency of the radar wave is modulated so as to linearly vary in time. After the target object reflects the radar wave, the reflected radar wave is received by the radar and transformed into a received signal to be subjected to signal processing for obtaining the target characteristic. The FMCW radar mixes the transmission signal and the received signal to produce a beat signal. The beat signal is subjected to a frequency analysis, for example, a fast Fourier transformation (FFT) and the like, to obtain the peak frequencies of the beat signal (beat frequencies) from which the distance to the target object and the relative speed between the FMCW radar and the target object can be determined. The frequency spectrum has peak intensities in the intensity versus frequency characteristic curves. The beat frequencies have the peak intensities.

During those operations, there is a possibility that the FMCW radar receives not only the reflected wave from the target object, but also a radar wave transmitted from some other radar installed in another vehicle, such as a vehicle running on the same or other side of the road (e.g., a preceding vehicle or an oncoming vehicle). That is, interference between the FMCW radar with which the subject vehicle is equipped and the other radar installed in the other vehicle may occur. As a result of interference, it is hard to detect the beat frequencies accurately, and the distance to the target object such as the preceding vehicle or the relative speed of the target object cannot be accurately detected.

In Japanese Published Patent Application No. 2002-168947, Hirata et al. discloses an FMCW radar which provided with an interference detecting unit that determines whether or not the FMCW radar is interfered with by some other radar. The interference detecting unit of Hirata et al. determines whether or not interference between the FMCW radar equipped with the interference detecting unit and the other radar occurs based on an incident radio wave received by the FMCW radar or a beat signal which is generated from radar wave transmitted from the FMCW radar and the incident radio wave received by the FMCW radar. The incident radio wave may include not only return of the radar wave reflected from a target object, but also radio wave transmitted from the other radar or return of the radar wave from an obstacle located out of a measuring distance range (radar range) of the FMCW radar. In more detail, the interference detecting unit of Hirata et al. determines occurrence of interference, if either the amplitude of the incident radio wave or the beat signal is higher than a predetermined amplitude threshold value, or a beat frequency that is a frequency component at which an intensity peak can be found in frequency spectrum characteristic of the beat signal is higher than a predetermined frequency threshold value.

The method that is adopted by Hirata et al. and is based on comparison of the amplitude of the incident radio wave or the beat signal with the predetermined amplitude threshold value is performed is derived from the following idea: when interference between the FMCW radar and some other radar occurs, a radio wave transmitted from the other radar is superimposed on return of the radar wave reflected from a target object. Hence, the amplitude of incident radio wave which enters the FMCW radar or a beat signal which is generated by mixing a radar wave transmitted from the FMCW radar and the incident radio wave should be increased as compared with cases where no interference present.

The method that is adopted by Hirata et al. and is based on comparison of the beat frequency component with the predetermined frequency threshold value is performed is derived from the following idea: when the beat frequency that is the frequency component at which intensity peak can be found in frequency spectrum characteristic of the beat signal is higher than a predetermined frequency threshold value, the origin of the beat frequency component can be attributed to some obstacle located out of a measuring distance range (radar range) of the FMCW radar.

However, the methods of Hirata et al. may give an erroneous determination of presence of interference in the case where the amplitude of a radio wave transmitted from some other radar is low. That is, when the absolute amplitude of an incident radio wave or a beat signal is not so high to exceed a threshold value, the interference detecting unit of Hirata et al. can not detect occurrence of interference. Further, if low frequency noise is superimposed on the incident radar wave or the beat signal due to some reason, for example, short distance between a transmitting antenna through which the radar wave is radiated from the FMCW radar and a receiving antenna by which the incident radio wave is received, and the like, the absolute amplitude of the incident radio wave or the beat signal may exceed the threshold value, even if interference is absent.

In Japanese Published Patent Application No. 2006-300550 and the corresponding U.S. Pat. No. 7,187,321, Watanabe et al. discloses an FMCW radar that has an improved accuracy for detecting occurrence of interference using variations of absolute amplitude of an incident radio wave received by the FMCW radar or a beat signal which is generated from radar wave transmitted from the FMCW radar and the incident radio wave received by the FMCW radar. In the FMCW radar of Watanabe et al., the incident wave or the beat signal is sampled at a predetermined interval to generate amplitude data. The variations of the absolute amplitude of the incident radio wave or the beat signal are calculated by comparing two sampled absolute amplitude values at neighboring sampling points. If the maximum amplitude of the variations exceeds a predetermined value, it is determined interference occurs. If the predetermined interval at which the incident wave or the beat signal is sampled becomes shorter, it may be possible to detect occurrence of interference even if the amplitude of a radio wave transmitted from some other radar is low. However, shortening the predetermined interval may not be recommended because this leads to increasing the amount of computation in some situation, for example, where it is not easy to perform large scale computation by a vehicle-mounted FMCW radar.

Further, as previously discussed about the methods of Hirata et al., if low frequency noise is superimposed on the incident radar wave or the beat signal, the variations of the amplitude of the incident radio wave or the beat signal may exceed the threshold value, even if interference is absent.

Further, if the method of Watanabe et al. is combined with method for detecting direction of a target object such as the multiple signal classification (MUSIC) method in which incident radio wave entering a radar is received by a plurality of receiving antennas to generate a plurality of data signals each of data signals being generated by incident radio wave received by the corresponding one of the receiving antennas, and from the historical data of the plurality of data signals are constituted a self-correlation matrix by which the direction of the target object can be calculated, detection of occurrence of interference between the radar and some other radar is important because an erroneous detection of occurrence of interference at some moment influences on the accuracy of detection of direction of a target object over a long time subsequently.

Therefore, it is desired a radar that is capable of reducing computational cost to detect occurrence of interference between the radar and some other radar reliably, and to measure target characteristic such as presence of a target object within the measuring distance range of the radar system, distance between the radar system and the target object, and relative velocity of the target object to the radar system accurately, even if some large or long obstacles such as trucks and lorries, or large and long buildings such as a freeway bridge and its piers exist beyond the measuring distance range of the radar, and even if there are multiple target objects within the measuring distance range of the radar.

SUMMARY OF THE INVENTION

The present invention has been made to solve the above-mentioned problems, and therefore an object of the present Invention is to provide an FMCW radar, in particular a vehicle-mounted FMCW radar, and a method for accurately detecting an occurrence of interference between a return of a radar wave which has been transmitted by a radar and has an oscillating amplitude in time and a radio wave transmitted by some other radar, based on a periodicity of extremal points of the beat signal.

The method for detecting occurrence of interference between the FMCW radar 2 and some other radar according to the present embodiment includes steps of: calculating changes in the amplitude differences VD of the received signal or the beat signal over time, identifying extremal points in time-dependent amplitude curve of the beat signal B, counting the numbers of the extremal points within each subperiods, judging of whether or not each of the numbers of the extremal points within each of subperiods is normal, and determining some subperiod during which interference between the FMCW radar 2 and some other radar occurs based on a result of judgment of whether or not each of the numbers of the extremal points within each of subperiods is normal.

That is, in the method according to the present invention, only the numbers of the extremal points in the time-dependent amplitude curve of the beat signal B is utilized to determine whether or not interference between the FMCW radar 2 and some other radar occurs. This method uses the fact that in general, noise signal which is transmitted from the other radar and is superimposed on a return of radar wave and which has only either harmonic components much different from those of the radar wave or aperiodic components. Hence, even if level of the noise signal is low, it is possible to detect occurrence of interference. This means that only a small amount of computational power is required to perform the method.

According to a first aspect of the present invention, there is provided a method for detecting an occurrence of interference between a return of a radar wave which has been transmitted by a radar and has an oscillating amplitude in time and a radio wave transmitted by some other radar.

The method according to this aspect of the present invention includes steps of: detecting extremal points of an incident radio wave, extracting emerging patterns of the extremal points sequentially in time, detecting a period during which the emerging pattern of the extremal points is irregular, and determining whether or not the interference is occurring In the step of detecting the extremal points of the incident radio wave, the extremal points of the incident radio wave in which the radio wave transmitted by the other radar is superposed on the return of the radar wave are detected, wherein each of the extremal points is a moment at which either a maximum or minimum in amplitude of the incident radio wave appears.

In the extracting emerging patterns of the extremal points sequentially in time, an emerging pattern of the extremal points of the incident radio wave within each of periods of time to obtain a series of emerging patterns of the extremal points.

In the step of detecting a period during which the emerging pattern of the extremal points is irregular, the period during which the emerging pattern of the extremal points is irregular among the series of the emerging patterns of the extremal points.

In the step of determining interference, it is determined that interference has been detected as occurring within the detected period.

According to a second aspect of the present invention, there is provided a method for detecting an occurrence of interference between a return of a radar wave which has been transmitted by a radar and has an oscillating amplitude in time, and a radio wave transmitted by some other radar.

The method according to this aspect of the present invention includes steps of: the detecting extremal points of an incident radio wave, counting a number of the extremal points sequentially in time, averaging the counted numbers of the extremal points, and determining whether or not the interference is occurring.

In the step of counting a number of the extremal points sequentially in time, the number of the extremal points of the incident radio wave at a predetermined counting period is counted to determine each of counted numbers of the extremal points of the incident radio wave within each of the counting periods.

In the step of determining averaging, the counted numbers of the extremal points of the incident radio wave are averaged to determine an average number of the extremal points per counting period.

In the step of determining whether or not the interference is occurring, it is determined whether or not the interference is occurring within one of the predetermined periods based on a difference between the average number of the extremal points and one of the counted numbers of the extremal points of the incident radio wave within the one of the counting periods.

Further, it is allowed that the method according to one aspect of the present invention further includes a step of generating a first beat signal and a second beat signal by mixing the incident radio wave received by the radar and the radar wave transmitted from the radar in the upward modulated section and in the downward modulated section, respectively.

In this case, it is preferable the radar is a frequency modulated continuous wave (FMCW) radar that transmits a frequency-modulated radar wave whose frequency changes in time, the radar wave having an upward modulated section during which the frequency of the radar wave increase in time and a downward modulated section during which the frequency of the radar wave decrease in time, and at least one of the first and second signals is used to calculate the histogram of intensities of frequency components of the beat signal.

According to a third aspect of the present invention, it is provided a frequency modulated continuous wave (FMCW) radar that detects a target object characteristic including at least one of presence of a target object within a measuring range of the radar, a distance between the target object and the radar, and a relative speed of the target object to the radar.

The FMCW radar according to this aspect of the present invention, includes a transmission signal generator, a transmission antenna, a reception antenna unit, a beat signal generator, an extremal point detector, a counter, an average calculator, a determining unit, an frequency analyzer, a peak frequency detector, and a target object characteristic calculator.

The transmission signal generator generates a transmission signal whose frequency is modulated so as to have a upward modulated section during which the frequency of the transmission signal increase in time and a downward modulated section during which the frequency of the transmission signal decrease in time.

The transmission antenna transmits the transmission signal as a radar wave in direction of the measuring range, the measuring range being limited the farthest distance thereof which correspond to a maximum measurement frequency.

The reception antenna unit receives an incident radio wave including a return of the radar wave from the target object located within the measuring range of the radar so as to generate a received signal based on the incident radio wave.

The beat signal generator generates a first and second beat signals with respect to each of the upward modulated section and the downward modulated section, respectively, based on both the transmission signal and the received signal.

The extremal point detector detects extremal points of at least one of the first and second beat signals, each of the extremal points being a moment at which either a maximum or minimum in amplitude of the first beat signal or the second beat signal appears.

The counter counts a number of the extremal points of the incident radio wave at a predetermined counting period to determine each of counted numbers of the extremal points of the incident radio wave within each of the counting periods, sequentially in time.

The average calculator performs averaging the counted numbers of the extremal points of the incident radio wave to determine an average number of the extremal points per counting period.

The determining unit determines whether or not the interference is occurring within one of the predetermined periods based on a difference between the average number of the extremal points and one of the counted numbers of the extremal points of the incident radio wave within the one of the counting periods.

The frequency analyzer performs frequency analysis on the first and second beat signals to obtain a first and a second frequency spectrum characteristic thereof which show distribution of intensities of the beat signal in frequency domain with respect to the upward modulated section and the downward modulated section, respectively.

The peak frequency detector detect a first and second peak frequencies which has respective highest intensities in the first and second frequency spectrum characteristic, respectively, if the first and second peak frequencies are below the maximum measurement frequency.

The target object characteristic calculator calculates the target object characteristic based on the first and second peak frequencies.

Further, it is allowed that the FMCW radar according to this aspect of the present invention further includes a calculator.

Further, it is allowed that the extremal point detector includes a sampling unit, a difference calculator, and a detector.

The sampling unit time-sequentially samples amplitudes of the first and second beat signals at sampling times to generate changes in amplitudes of the first and second beat signals, respectively.

The difference calculator calculates differences between successive sampling times in the changes in amplitudes of the first and second beat signals to generate changes in difference of the amplitudes of the first and second beat signals, respectively.

The detector detects one of the sampling times at which signs of the difference of the amplitudes of the first and second beat signals are reversed with respect to those at a preceeding one of the sampling times as one of the extremal points.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings:

FIG. 7B is an explanatory diagram showing changes in amplitude differences between successive periods of the beat signal over time;

FIG. 7C is an explanatory diagram showing extremal points at which the sign of the amplitude differences of the beat signal is reversed;

FIG. 7D is an explanatory diagram showing changes in numbers of the extremal points within each of subperiods, each of subperiods having a unit period $\tau$, and the numbers of the extremal points within one of the subperiods being examined whether or not there is a subperiod which has the number of the extremal points exceeding a interference threshold number;

DETAILED DESCRIPTION OF PREFERRED EMBODIMENTS

Figure 1:
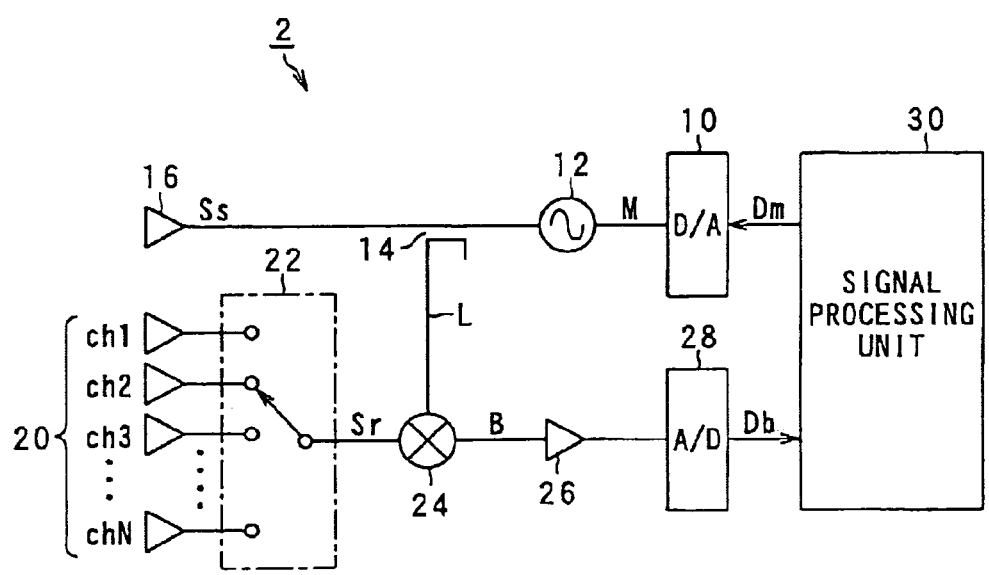
FIG. 1 is a block diagram showing an FMCW radar according to the present invention.

Preferred embodiments of the present invention will be explained below with reference to attached drawings. Identical constituents are denoted by the same reference numerals throughout the drawings.

First Embodiment

Referring to FIGS. 1-9, a first embodiment of the present invention will be explained.

FIG. 1 is a block diagram showing a vehicle-mounted FMCW radar according to the present invention. The FMCW radar detects the distance to a target object located in a measuring range and/or a relative speed of the target object such as a preceding vehicle.

As shown in FIG. 1, the FMCW radar 2 includes a digital-analog (D/A) converter 10, an oscillator 12, a splitter 14, a transmitting antenna 16, and a signal processing unit 30.

The D/A converter 10 receives digital data Dm from the signal processing unit 30 and converts the received digital data Dm to an analog signal M. The oscillator 12 receives the analog signal M from the D/A converter 10 and thereby generates a radio frequency signal in the millimeter wave band, the frequency of the signal varying in time according to information contained in the analog signal M. The splitter 14 splits the electric power of the radio frequency signal generated by the oscillator 12 into a first portion relating to a transmission signal Ss, which is the radio frequency signal in the millimeter wave band, and a second portion relating to a local signal L that will be used to generate a beat signal. The transmitting antenna 16 radiates the transmission signal Ss as a radar wave toward a measuring range where a target object may be located.

The analog signal M is modulated by the D/A converter 10 to be formed in a triangular waveform having a period of $2 \times \Delta T$ where $\Delta T$ is called the sweep time. The frequency of the radio frequency signal generated by the oscillator 12 is modulated so as to increase linearly with the sweep time $\Delta T$, and then be linearly decreased within the sweep time $\Delta T$, according to the analog signal M. So the time dependence of the frequency of the transmission signal Ss has the same form with that of the local signal L. In the following, the time period during which the frequency of the radio frequency signal is linearly increased is called the upward modulated section or upsweeping modulation section, and the time period during which the frequency of the radio frequency signal is linearly decreased is called the downward modulated section or downsweeping modulation section.

The FMCW radar 2 further includes a receiving antenna unit 20, an antenna switch 22, a mixer 24, an amplifier 26, and an analog-digital (A/D) converter 28.

The receiving antenna unit 20 is constructed of N receiving antennas that receives a reflected radar wave reflected by the target object located in the measuring range. It is preferable that the N receiving antennas are arranged aligned in a line and evenly spaced. This arrangement will be useful to detect the direction of the target object. Each of the receiving antennas connects to the corresponding receiving channel of the receiving switch 22. The antenna switch 22 selects one of the N receiving antennas constituting the receiving antenna unit 20, and supplies a received signal Sr from the selected receiving antenna to the downstream stage. The antenna switch 22 is connected to the signal processing unit 30. The signal processing unit 30 controls the timing of change for selecting the working antenna among the N receiving antennas of the receiving antenna unit 20. The mixer 24 mixes the received signal Sr supplied from the antenna switch 22 and the local signal L inputted from the splitter 14 to produce a beat signal B. The amplifier 26 amplifies the beat signal produced by the mixer 24 based on the received signal Sr and the local signal L. The amplified beat signal generated by the amplifier 26 is inputted into the A/D converter 28 to convert into digital data Db using a technique for digitizing the amplified beat signal, for example, by sampling the magnitude of the amplified beat signal at a predetermined sampling frequency. In order to generate a sampled signal with a sampling period corresponding to the predetermined sampling frequency, the A/D converter 28 further comprises a timer which is synchronized with a clock of the signal processing unit 30. The signal processing unit 30 receives the digital data Db from the A/D converter 28 and performs signal processing on the digital data Db to obtain information about the target characteristic such as the downrange distance to the target object that reflects the radar wave and the relative speed between the subject vehicle equipped with the FMCW radar 12 and the target object.

The signal processing unit 30 is mainly composed of a central processing unit (CPU), a memory such as a read only memory (ROM) and a random access memory (RAM), and a digital signal processor which is configured to execute a fast Fourier transformation (FFT) in signal processing of the digital data Db. The signal processing unit 30 further includes a clock that controls operation speed of the CPU and the digital signal processor and is used to measure time. The signal processing unit 30 connects to the antenna switch 22 and the A/D converter 28 to control the timing of change for selecting the working antenna and to convert the beat signal B to the digital data Db, respectively.

The N receiving antennas of the receiving antenna unit 20 are assigned to channel 1 (ch1) to channel N (chN), respectively. Let the sampling frequency per channel be fs, the predetermined sampling frequency of the A/D converter 28 should be $F_{samp} = N \times fs$.

The sampling frequency per channel fs is set as follows: if the maximum measurement frequency is defined as the frequency of a beat signal B corresponding to the farthest distance within the measuring range of the FMCW radar 2, the maximum measurement frequency limits a measuring frequency range such that frequencies below the maximum measurement frequency may be used to detect the distance to the target object that reflects the radar wave and the relative speed between the subject vehicle equipped with the FMCW radar 12 and the target object. Hence, the sampling frequency per channel fs is set to be twice the maximum measurement frequency or larger, preferably quadruple the maximum measurement frequency or larger. This means that the A/D converter 28 executes oversampling to extract redundant information from the beat signal B.

In the FMCW radar 2 constructed by the above-mentioned manner, the analog signal M is produced by the D/A converter 10 according to the digital data Dm from the signal processing unit 30. The frequency of the analog signal M varies in time. Then, the oscillator 12 generates the radio frequency signal in the millimeter wave band. The frequency of the radio frequency signal varies with time in the same way as the frequency of the analog signal M varies. The radio frequency signal generated by the oscillator 12 is split by the splitter 14 to generate the transmission signal Ss and the local signal L. The antenna 16 radiates the transmission signal Ss as the radar wave toward the measuring range.

The radar wave radiated from the antenna 16 of the FMCW radar 2 is reflected by a target object such as a preceding vehicle or an oncoming vehicle located in the measuring range. The reflected radar wave coming back to the FMCW radar 2 is received by all N receiving antennas of the receiving antenna unit 20. However, the receiving antenna unit 20 receives electromagnetic wave that is transmitted from some other radar or is reflected by some obstacle located out of the measuring range of the FMCW radar 2. These electromagnetic waves which are not expected to detect the target object located in the measuring range are identified as noise signals.

The N receiving antennas are indexed by channel i (ch i) (i=1, 2, ..., N). The antenna switch 22 successively selects one of the N receiving antennas such that the channel selected by the antenna switch 22 is changed at a predetermined interval, and supplies the received signal Sr which is received by the antenna connecting to the selected channel of the receiving switch 22 to the mixer 24. It is preferable that the antenna switch 22 includes a timer to change the selected antenna at the predetermined interval. Further it is allowed that the antenna switch 22 connects to the signal processing unit 30 and receives timing signals to change channel. The mixer 24 mixes the received signal Sr supplied from the antenna switch 22 and the local signal L inputted from the splitter 14 to produce the beat signal B. The beat signal B is amplified by the amplifier 26, and then is inputted into the A/D converter 28 to convert into a digital data Db using a technique of digitizing the amplified beat signal. The signal processing unit 30 receives the digital data Db from the A/D converter 28 and performs signal processing on the digital data Db to obtain information about the target characteristic such as the downrange distance to the target object that reflects the radar wave and the relative speed between the subject vehicle equipped with the FMCW radar 12 and the target object.

Referring to FIGS. 2A to 2D, a method for detecting the target characteristic such as the distance to the target object that reflects the radar wave and the relative speed between the subject vehicle equipped with the FMCW radar 2 and the target object will be described.

Figure 2A:
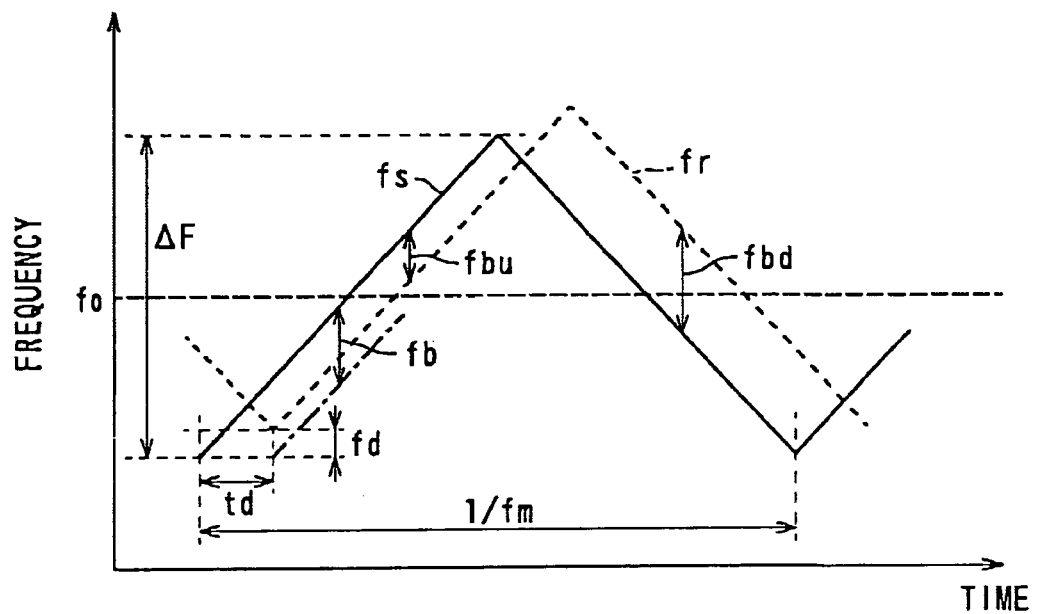
FIG. 2A is an explanatory graph showing frequency changes over time of a radar wave transmitted from the FMCW radar within an upward modulated section and a downward modulated section and of a reflected radar wave from a target object.

As shown in FIG. 2A, the frequency of the radar wave fs which corresponds to the transmission signal Ss and is transmitted from the antenna 16, varies periodically as a saw-toothed waveform. The saw-toothed waveform of the frequency variation of the radar wave fs has the upward modulated section or upsweeping modulation section during which the frequency of the radar wave fs is linearly increased by the frequency modulation width $\Delta F$ during the sweep time $\Delta T$ equal to half of the width of the frequency variation of the radar wave fs, $1/f_m$, and the downward modulated section or the downsweeping modulation section during which the frequency of the radar wave fs is linearly decreased by the frequency modulation width $\Delta F$ during the sweep time $\Delta T$ equal to the half of the period of the frequency variation of the radar wave fs, $1/f_m$. Hence, one period of the frequency variation of the radar wave fs of $2\times\Delta T$ consists of one upward modulated section and the following downward modulated section. The central frequency of the radar wave fs is f0, as shown in FIG. 2A, which is used to calculate the distance between the device 2 and the target object and the relative speed of the target object. The central frequency f0 of the radar wave fs can be adjusted. The radar wave fs radiated from the antenna 16 of the FMCW radar 2 is reflected by the target object located within the measuring range. Then, the target object serves as a source of a reflected radar wave fr, and the reflected radar wave fr is received by the receiving antenna unit 20 to generate the received signal Sr. Both the received signal Sr supplied from the antenna switch 22 and the local signal L inputted from the splitter 14 are mixed by the mixer 24 to produce a beat signal B. Here, the beat signal B includes a mixed signal generated by the local signal L and the received signal Sr within the upward modulated section and a further mixed signal generated by the local signal L and the received signal Sr within the downward modulated section.

For example, the antenna switch 22 is designed to execute the following operation: the antenna switch 22 sequentially changes the selected channel of the antenna unit 20 from channel 1 (ch1) to channel N (chN) each time a timing signal is received from the signal processing unit 30, and repeatedly selects them. Let the number of times of sampling per channel and per one period of the frequency variation of the radar wave fs including the upward modulated section and the downward modulated section, i.e., sweep time $2\times\Delta T=2\times1/f_m$, be $2\times M_{samp}$.

Thus, when a measurement equivalent to one of the upward modulated section and the downward modulated section is completed, $M_{samp}$ pieces of sampled data are produced with respect to each of the channels ch1 to chN.

Figure 2B:
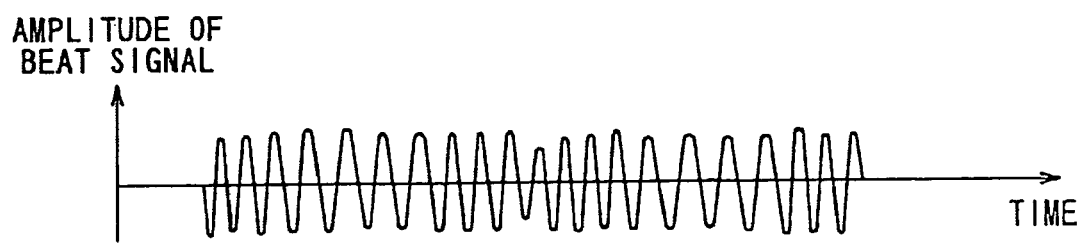
FIG. 2B is an explanatory graph showing the time dependence of the voltage amplitude of a beat signal generated by mixing the radar wave transmitted from the FMCW radar and the reflected radar wave from the target object.

FIG. 2B is an explanatory time chart showing the voltage amplitude of the beat signal generated by mixer 24. If no interference occurs and no large or long obstacles are located beyond the measuring range of the FMCW radar 2, and there are only target objects having zero relative speed to the radar 2 within the measuring range, the beat signal has a sinusoidal waveform having a constant frequency.

Figure 2C:
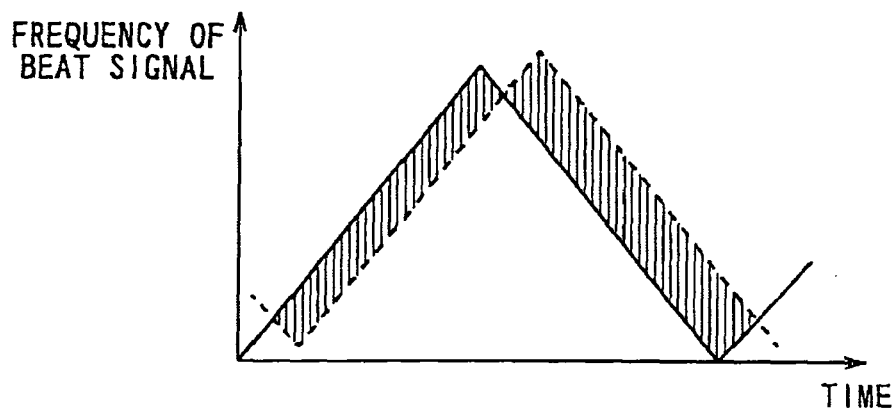
FIG. 2C is an explanatory graph showing a frequency change of the beat signal over time.

As shown in FIGS. 2A and 2C, in each of the upward modulated section and the downward modulated section, the A/D converter 28 samples the beat signal B recursively at a predetermined sampling period and converts the sampled beat signal B to the digital signal Db. Thus, the frequency variation of the reflected radar wave fr which includes a frequency increasing period and a frequency decreasing period is generated.

For example, in the case where the velocity of the vehicle-mounted FMCW radar 2 is equal to the velocity of the target object, that is, in the case where the relative speed of the target object is zero, the reflected radar wave is retarded by the time which it takes for the radar wave to travel between the radar 2 and the target object at the velocity of light c. In this case, the reflected radar wave from the target object fr is shifted in time by a retarded time td relative to the radar wave fs, as shown in FIG. 2A. Further, the beat signal B is analyzed by the Fourier analysis or other frequency analytical tool to obtain the power spectrum characteristic or other frequency spectrum characteristic of the beat signal B.

Figure 2D:
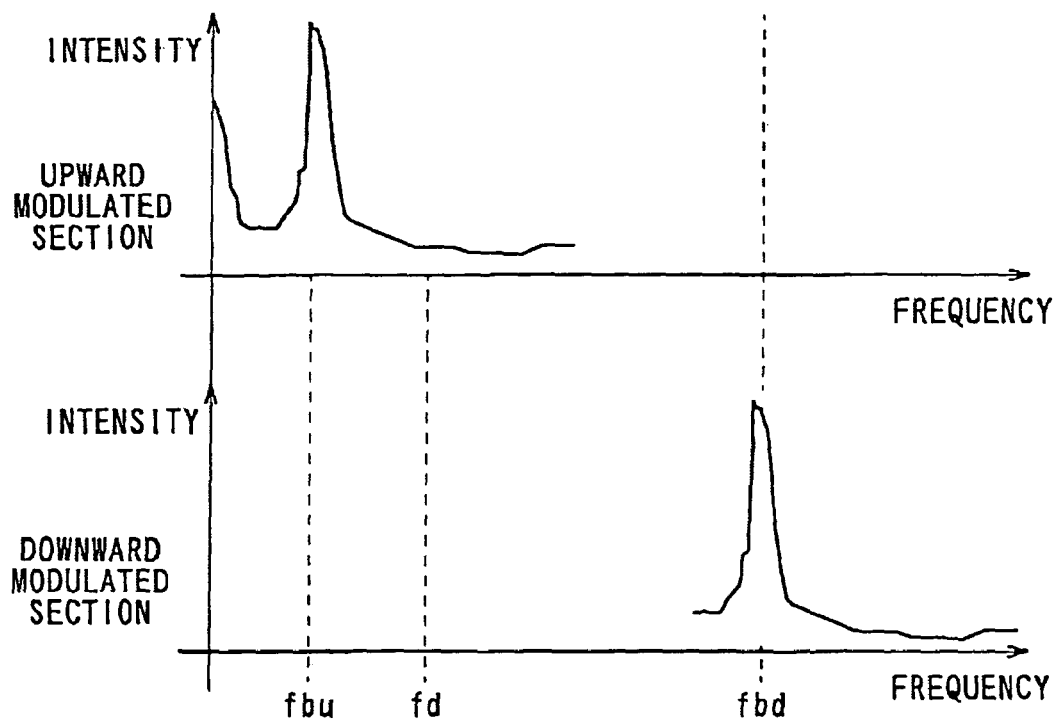
FIG. 2D is an explanatory diagram showing beat frequencies within the upward modulated section and the downward modulated section, the beat frequencies being used to determine the distance to the target object and the relative speed of the target object.

FIG. 2D is an explanatory diagram showing beat frequencies within the upward modulated section and the downward modulated section.

In the currently considered case where the relative speed of the target object is zero, the peak frequency fbu of the beat signal in the frequency increasing period is equal to the peak frequency fbd of the beat signal in the frequency decreasing period. Let a distance between the radar 2 and the target object be D, the distance D is easily obtained by multiplying the velocity of light c by the retarded time td as: $D=td\times c$.

However, in the case where the velocity of the vehicle-mounted FMCW radar 2 is different from the velocity of the target object, that is, in the case where the relative speed of the target object is not zero, the reflected radar wave has Doppler shift fd. Hence, the frequency of the reflected radar wave fr is shifted in frequency by the Doppler shift fd as well as in time by the retarded time td. In this case, as shown in FIG. 2D, the peak frequency fbu of the beat signal in the frequency increasing period is different from the peak frequency fbd of the beat signal in the frequency decreasing period. That is, the frequency of the reflected radar wave fr is shifted in time by the retarded time td as well as in frequency by the Doppler shift fd. Let the relative speed of the target object be V, the relative speed of the target object V can be calculated from the frequency difference between the radar wave fs and the reflected radar wave fr in the frequency axis in FIG. 2A.

The retarded time td of the reflected radar wave fr from the radar wave fs corresponds to a first component fb of the frequency shift of the reflected radar wave fr from the radar wave fr such that:

$$fb = \frac{|fbu| + |fbd|}{2}, \quad (1)$$

where fbu and fbd are the peak frequency of the beat signal in the frequency increasing period and the peak frequency of the beat signal in the frequency decreasing period, respectively. Because, the first component fb in equation (1) is obtained by removing the effect due to the Doppler shift, the first component fb of the frequency shift corresponds to the distance D between the apparatus 2 and the target object, as in the following;

$$D = \frac{c}{4 \times \Delta F \times f_m} \times fb, \quad (2)$$

where $\Delta F$ is the frequency modulation width during half of the period of the frequency variation of the radar wave fs, $1/f_m$, c is the velocity of light.

The Doppler shift fd relating to the relative speed V of the target object can be expressed using the peak frequency fbu of the beat signal in the frequency increasing period and the peak frequency fbd of the beat signal in the frequency decreasing period, as follows:

$$fd = \frac{|fbd| - |fbu|}{2}. \quad (3)$$

The relative speed V of the target object can be obtained from the peak frequencies fbu and fbd, using the following expression:

$$V = \frac{c}{2 \times f0} \times fd, \quad (4)$$

where f0 is the central frequency of the radar wave fs.

Hence, using the peak frequency fbu of the beat signal in the frequency increasing period and the peak frequency fbd of the beat signal in the frequency decreasing section, it is possible to obtain the distance between the FMCW radar 2 and the target object and the relative speed of the target object to the FMCW radar 2. Therefore, the determination of the peak frequencies fbu and fbd in the beat signal B is one of the important subjects in the frequency analysis. In order to determine the peak frequencies fbu and fbd accurately, separation of noise components in the frequency spectrum characteristic of the beat signal which directly relate to neither the distance between the target object and the radar 2 nor the relative speed of the target object is important. The noise components in the frequency spectrum characteristic of the beat signal may be generated due to interference which occurs in cases where the FMCW radar with which the subject vehicle is equipped and the other radar installed in another, interfering vehicle has different modulation gradients of radar waves from each other even if only slightly, or where the other radar is not of FMCW. Those noise components in the frequency spectrum characteristic of the beat signal lead to raise the noise floor level so that the heights at the peak frequencies fbu and fbd might not exceed the noise floor level. In general, the noise floor level is defined as the lowest threshold of useful signal level. Hence, the noise floor level is the intensity of the weak noise whose source is not specified, and affected by interference between the FMCW radar and some other radar, if interference occurs. Further, conventional tools for determining whether interference is present between the FMCW radar and some other radar gives an erroneous conclusion due to the existence of large target objects located far beyond the measuring region. Thus, it is important to detect large target objects located far beyond the measuring region of the FMCW radar 2.

Referring to FIGS. 3A to 4C, more detailed explanations for how the noise floor level increases in several situations such as where the FMCW radar with which the subject vehicle is equipped and the other radar installed in the other (interfering) vehicle has different modulation gradients of radar waves from each other even if the only slightly, and where the other radar is not of FMCW, for example, two-frequency continuous wave, multi-frequency continuous wave, pulse, spread spectrum, and the like will be explained.

Figure 3A:
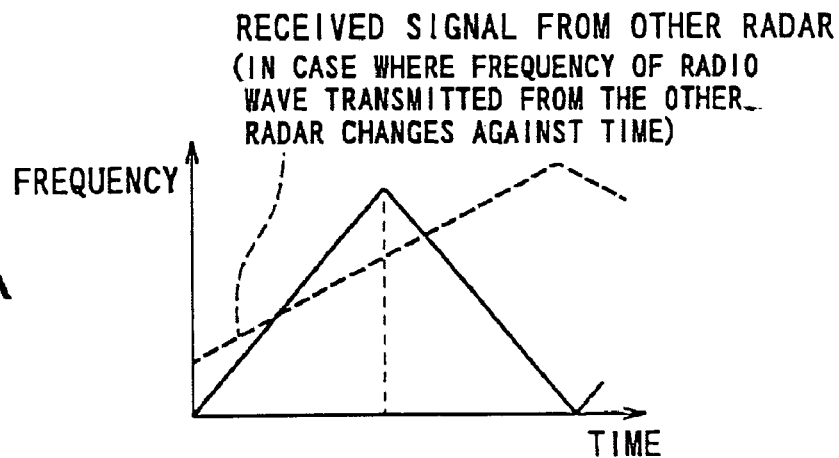
FIG. 3A is an explanatory diagram showing frequency changes of the radar wave transmitted from the FMCW radar and of the received radar wave transmitted from some other radar against time, when the frequency spectrum characteristic of the beat signal is affected by interference from some other radar transmitting a radar wave having a different modulation gradient from that of the radar wave transmitted from the FMCW radar.

FIG. 3A is an explanatory diagram showing changes in time of frequencies of radar wave transmitted from the FMCW radar 2 and of received radar wave transmitted from some other radar transmitting radar waves having a different modulation gradient from that of the radar wave transmitted from the FMCW radar. In this case, the range of the frequency variation of the radar wave fs within the upward modulated section and the downward modulated section overlaps with the range of the frequency variation of the radar waves transmitted simultaneously from the other radar in a time period.

Figure 3B:
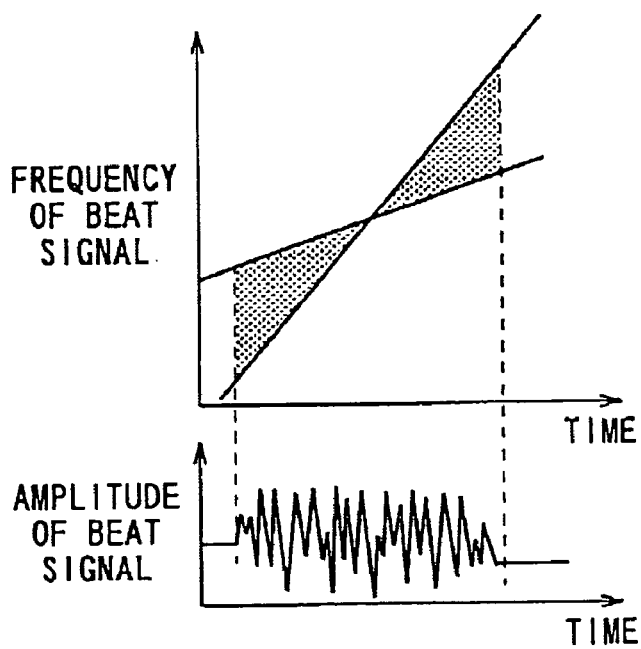
FIG. 3B is an explanatory diagram showing frequency changes of the beat signal and of amplitude of voltage of the beat signal over time when the frequency spectrum characteristic of the beat signal are affected by existence of some other radar transmitting the radar wave having a different modulation gradient from that of the radar wave transmitted from the FMCW radar.

FIG. 3B is an explanatory diagram showing changes of frequency of the beat signal B and of amplitude of voltage of the beat signal B over time. As shown in FIG. 3B, within the upward modulated section, the frequency difference between the local signal L0 and a received radar wave including the radar wave transmitted from the other radar is variable and varies greatly in contrast to the case shown in FIG. 2A. The beat signal is generated by mixing the local signal L0 and the received signal Sr.

If the other radar transmits radar waves having the same frequency variation pattern with the radar wave transmitted from the FMCW radar 2, that is, if the frequency of the radar wave transmitted from the other radar increases within the upward modulated section of the radar wave and decreases within the downward modulated section, a narrow peak appears in the frequency spectrum characteristic in the beat signal.

However, if the frequency gradient of the radar wave transmitted by the other radar is different from that of the radar wave transmitted from the FMCW radar 2, a broad peak will be caused in the frequency spectrum characteristic of the beat signal because the difference between the frequencies of the radar waves transmitted from the other radar and the FMCW radar 2 varies in time so that many components of the frequency spectrum are included in the frequency spectrum characteristic of the beat signal.

Figure 3C:
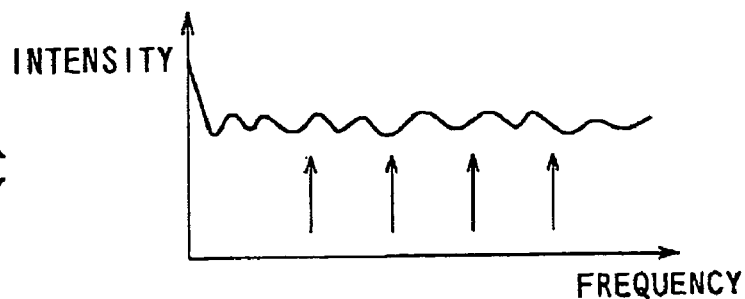
FIG. 3C is an explanatory diagram showing electric power spectrum characteristic of the beat signal when the frequency spectrum characteristic of the beat signal is affected by existence of some other radar transmitting the radar wave having a different modulation gradient from that of the radar wave transmitted from the FMCW radar.

FIG. 3C is an explanatory diagram showing the electric power spectrum characteristic of the beat signal in this case. It can be seen that the noise floor level is increase d by the interference between the FMCW radar 2 and the other radar that transmits the radar wave having the different modulation gradient from that of the radar wave transmitted from the FMCW radar 2.

Figure 4A:
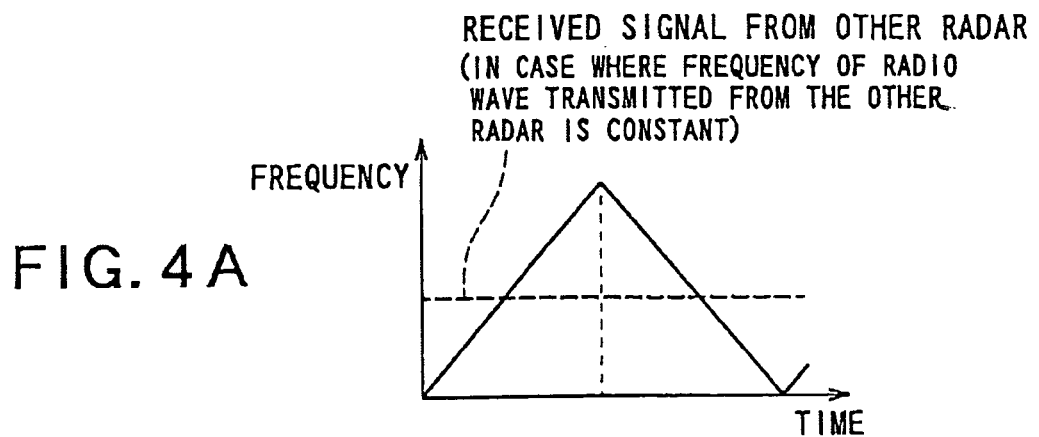
FIG. 4A is an explanatory diagram showing frequency changes of radar wave transmitted from the FMCW radar and a constant frequency of received radar wave transmitted from some other radar over time when the frequency spectrum characteristic of the beat signal is affected by some other radar transmitting a radar wave having a constant frequency over time.

FIG. 4A is an explanatory diagram showing the change over time in frequencies of radar wave transmitted from the FMCW radar 2 and a constant frequency of received radar wave transmitted from some other radar. The radars that transmit a radar wave having a constant frequency such as a two-frequency continuous wave type radar, a multi-frequency continuous wave type radar, a pulse type radar, and a spectrum spreading type radar.

Figure 4B:
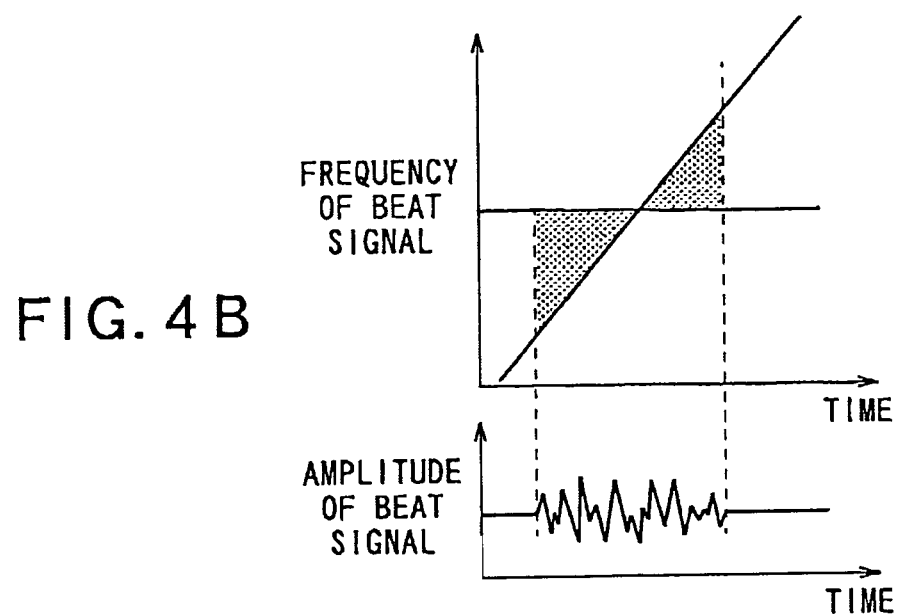
FIG. 4B is an explanatory diagram showing frequency changes of the beat signal and the voltage amplitude of the beat signal over time when the frequency spectrum characteristic of the beat signal are affected by some other radar transmitting with the constant frequency over time.

FIG. 4B is an explanatory diagram showing changes of frequency of the beat signal and of amplitude of voltage of the beat signal in time. In the case shown in FIG. 4B, within both the upward modulated section and the downward modulated section, the frequency difference between the local signal L0 and the received radar wave including the radar wave transmitted from the other radar is not constant and varies greatly in contrast to the case shown in FIG. 2A.

Figure 4C:
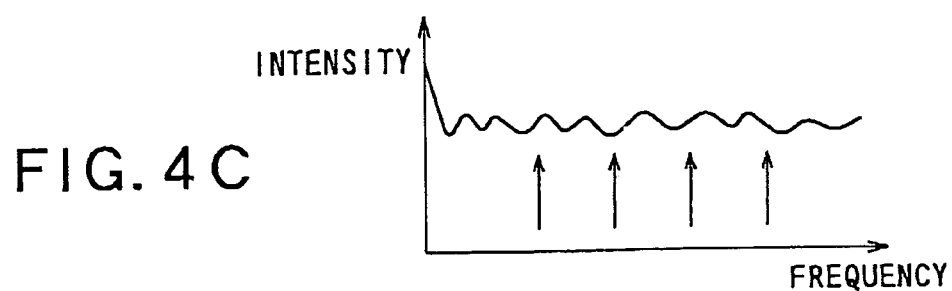
FIG. 4C is an explanatory diagram showing the electric power spectrum characteristic of the beat signal when the frequency spectrum characteristic of the beat signal is affected by some other radar transmitting the radar wave having the constant frequency over time.

In this case, as shown in FIG. 4C, the noise floor level is increased by the interference between the FMCW radar 2 and the other radar that transmits the radar wave having the different modulation gradient from that of the radar wave transmitted from the FMCW radar 2.

In both cases shown in FIGS. 3A and 4A, the beat signal includes frequency components from a low frequency to a high frequency, because the frequency difference between the local signal L0 and the received radar wave including the radar wave transmitted from the other radar is not constant and varies greatly. Therefore, when interference is caused between the radar waves transmitted from the FMCW radar 2 and the other radar, the frequency spectrum characteristic obtained by a frequency analysis may include a broad peak or enhanced noise floor level. If we define the maximum measurement frequency as a frequency below which the beat frequency corresponding to the target characteristic of the target object located within a measuring range of the FMCW radar, some frequency components of the broad peak are beyond the maximum measurement frequency.

The broad peak generated by interference by some other radar is detected by using one of known techniques utilizing the fact that a rise in the noise floor level of the frequency spectrum characteristic of the beat signal leads to an increase in the sum of intensities of the high frequency components or the count of frequency components which satisfy the predetermined conditions. Using this fact, if the sum or the count exceeds a corresponding threshold value, the conventional FMCW radars conclude that interference by some other radar occurs.

If some large vehicles such as trucks and lorries, or buildings such as a freeway bridge and its piers are at a place further than the measuring range of the FMCW radar 2, the frequency spectrum characteristic of a beat signal may contain multiple very large peaks in the high frequency region beyond the maximum measurement frequency. Thus, large target objects located far beyond the measuring region of the FMCW radar increase the sum of intensities of the high frequency components and the count of frequency components which satisfy the predetermined conditions without any other radar, and result in erroneous determinations of interference by some other radar when one of the known techniques is applied.

Hereinafter, referring to FIG. 5, a method for determining whether interference by some other radar occurs will be explained. The method to be explained below results in improving accuracy of determining whether interference by some other radar occurs.

Figure 5:
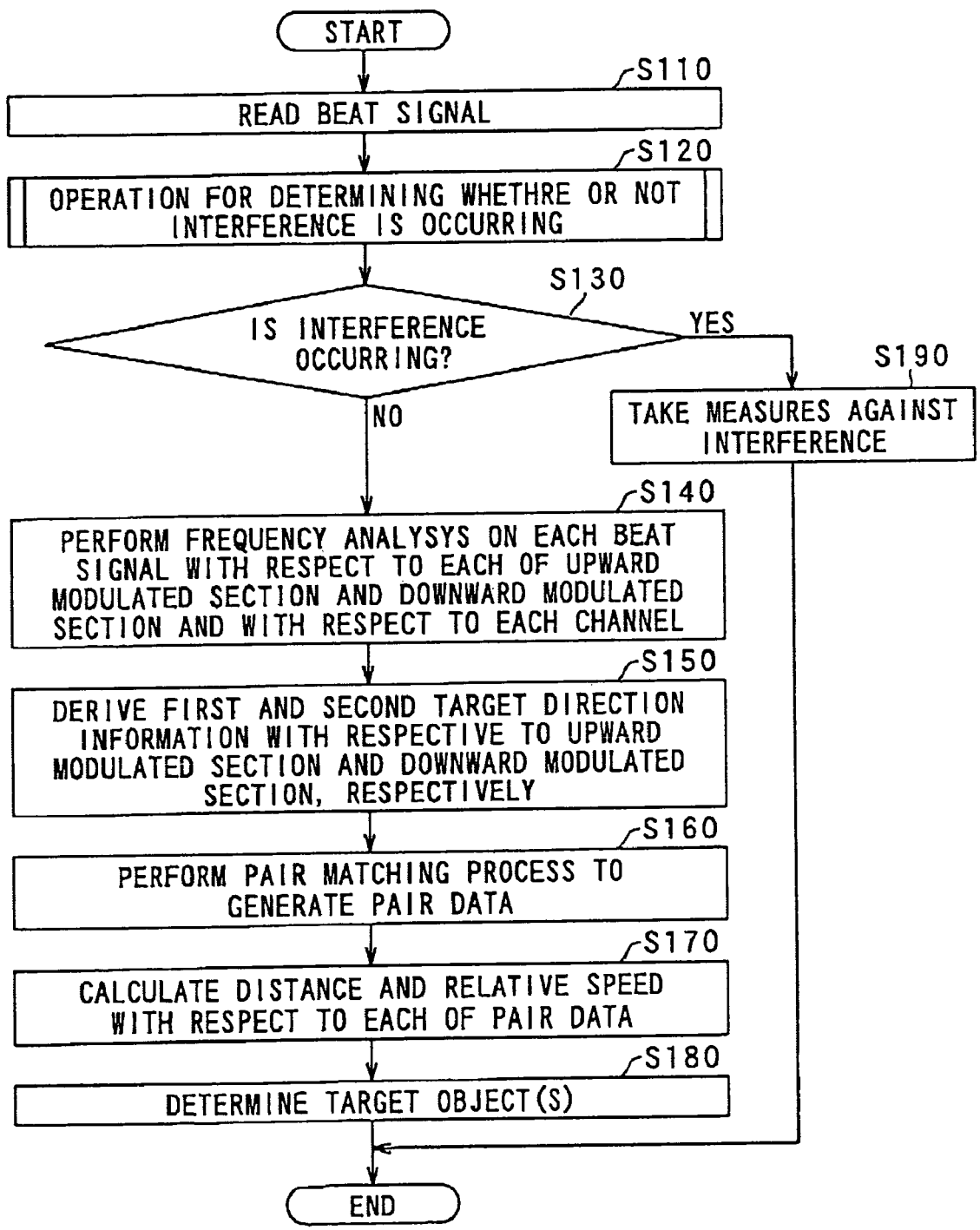
FIG. 5 is a flow chart showing a process for detecting the target object characteristic such as presence of a target object within a radar range of the radar, a distance between the target object and the radar, and a relative speed of the target object to the FMCW radar according to a first embodiment of the present invention, the process including a step of detecting occurrence of interference between the FMCW radar and some other radar based on periodicity of extremal points in an amplitude curve of received signal or beat signal.

FIG. 5 is a flow chart showing a process for detecting the detecting the target object characteristic such as presence of a target object within a radar range of the radar, a distance between the target object and the radar, and a relative speed of the target object to the FMCW radar. The process includes a step of detecting occurrence of interference between the FMCW radar and some other radar. This interference detection is based on a producing a transformed version of the incident radio waves received by the FMCW radar 2, and analyzing the periodicity of extremal points in this transformed signal. Further details are given below.

It should be noted that in this embodiment, the beat signal is used as the transformed version of the incident radio waves. The beat signal is generated by mixing the transmission signal Ss and the received signal Sr. However, it is possible to use only the received signal Sr which is transformed from the incident radio wave as the transformed version.

The processes shown in FIG. 5 are carried out by the signal processing unit 30 in FIG. 1. This procedure starts and then repeats with a predetermined detecting interval.

At step S110, the signal processing unit 30 of the FMCW radar 2 outputs digital data Dm to the D/A converter 10. The digital data Dm includes information about frequency modulation of the radio frequency signal in the millimeter wave band to generate the radar wave over one period of the frequency variation. One period of the frequency variation consists of the upward modulated section and the downward modulated section. In the upward modulated section, the frequency of the radar wave fs is linearly increased by the frequency modulation width ΔF during the sweep time ΔT. In the downward modulated section, the frequency of the radar wave fs is linearly decreased by the frequency modulation width ΔF during the sweep time ΔT. The information for modulating the radio frequency signal is used by the oscillator 12 to generate the radar wave to be radiated from the antenna 16. Moreover, at step S110, the signal processing unit 30 reads digital data Db obtained by the A/D converter 28. The digital data Db is obtained by digitizing the beat signal generated by the mixer 24. The beat signal is generated by mixing the received signal Sr, i.e., the incident radio wave received by the receiving antenna unit 20, and the local signal L that includes information about the digital data Dm.

In this embodiment, the digital data Db of the beat signal B consists of first digital data including intensity of the beat signal in the frequency increasing section and second digital data including intensity of the beat signal in the frequency decreasing section. The digital data Db of the beat signal B is stored in the memory of the signal processing unit 30. Each of the first and second digital data has N×$M_{samp}$ pieces of sampled data. Thus, the A/D converter 28 executes oversampling to extract redundant information from the beat signal. The first and second digital data obtained in this step are stored in the memory of the signal processing unit 30 to be referred to when amplitude variations of the beat signal are calculated. Thus, the signal processing unit 30 stores historical digital data including the first and second digital data at least the previous digital data which were obtained in the previous loop operation defined in FIG. 5.

Subsequently at step S120, it is determined whether or not interference between the FMCW radar 2 and some other radar occurs based on a result of operation, performed at step S120. More detailed description about operations in this step will be discussed below referring to FIG. 6.

If a result of the determination at the step S140 is "YES", it is determined that interference between the FMCW radar 2 and some other radar occurs. Then, the procedure proceeds to step S190.

In contrast to this, that is, if the result of the determination at the step S140 is "NO", it is determined that no interference between the FMCW radar 2 and some other radar occurs. Then, the procedure proceeds to step S140.

At step S140, the signal processing unit 30 executes the frequency analysis, for example the fast Fourier transformation (FFT) analysis, for the first and second digital data of the beat signal corresponding to data in the frequency increasing section and in the frequency decreasing section, respectively. As a result of the fast Fourier transformation, complex values, each value being assigned to the one of the frequency components, are calculated. That is, a time domain representation of intensity of the beat signal is transformed to a frequency domain representation thereof by means of the Fourier transformation. The absolute value of each of complex values indicates the power of the corresponding frequency component. Thus, by means of the Fourier transformation, the power spectrum of the beat signal or the frequency spectrum characteristic can be obtained. Then, the procedure proceeds to step S150.

It is allowed that the first and second frequency spectrum characteristics of the beat signal corresponding to the first and second digital data, respectively, would be separately calculated. Further, it is allowed that each frequency spectrum characteristic of the beat signal with respect to each channel and each of the frequency increasing section and the frequency decreasing section would be calculated based on each $M_{samp}$ pieces of sampled data. In this case, two spectrum characteristic of the beat signal B are obtained.

It is noted that if the maximum measurement frequency is defined as a frequency of a beat signal B which indicates the farthest distance within the measuring distance range of the FMCW radar 2, i.e., a radar range, the maximum measurement frequency limits a measuring frequency range such that frequency components below the maximum measurement frequency are allowed to detect the distance to the target object that reflects the radar wave and the relative speed between the subject vehicle equipped with the FMCW radar 12 and the target object. Thus, high frequency components can be defined as those beyond the maximum measurement frequency. The frequency range covering the high frequency components will be referred as to the high frequency range.

The power spectrums of the beat signal or the frequency spectrum characteristics with respect to each of the frequency increasing section and the frequency decreasing section contain not only frequency components lower than or equal to the maximum measurement frequency, which will be referred as to a target-detecting frequency range, but also frequency components exceeding the maximum measurement frequency, i.e., within the high frequency range.

If the maximum measurement frequency is set to 116 kilohertz which corresponds to 256 meters when the relative speed of the target object is zero, the high frequency range can be set to be 200 to 333 kilohertz.

At step S150, individual frequency components which are below the maximum measurement frequency and whose power exceed a peak-detecting threshold value are separately collected as peak frequencies with respect to each of the upward modulated section and the downward modulated section and with respect to each channel. Then, the digital data $x_i(t)$ (i=1, ..., N) corresponding to each of the peak frequencies with respect to corresponding channel are collected from the received signal Sr to form a vector $X(t)=(x_1(t), ..., x_N(t))$. That is, the digital data $x_i(t)$ (i=1, ..., N) corresponds to each of the peak frequencies with respect to each channel over one period of $2 \times \Delta T$ in the saw-toothed waveform of the frequency variation of the radio frequency signal. It is preferable that each of the digital data $x_i(t)$ (i=1, ..., N) consists of data in 3 upward modulated sections or 3 downward modulated sections. This vector X(t) is utilized to obtain the direction of the target object-located within the measuring range of the FMCW radar 2. For example, the multiple signal classification (MUSIC) method can be applied to obtain the direction of the target object, if the N antennas of the receiving antenna unit 20 are equally separated. In the MUSIC method, a self-correlation matrix of X(t) plays a central role to estimate the direction of the target object. A description of the MUSIC method can be found in "Multiple emitter location and signal parameter estimation" by R. O. Schmidt, IEEE Trans. Antennas Propagat. Vol. 34 (3) March (1986) pp. 276-280.

Using the MUSIC method, the direction of the target object is detected based on the digital signal data $x_i(t)$ (i=1, ..., N) obtained at current loop operation in FIG. 5 and the digital signal data $x_i(t-1)$ (i=1, ..., N) obtained at the previous loop operation. Each of the digital signal data $x_i(t)$ and $x_i(t-1)$ constitutes of corresponding self-correlation matrices RS(t) and R(t−1). Using self-correlation matrices RS(t) and R(t−1), a relevant self-correlation matrix R(t) that is subjected by the MUSIC method at the current time is calculated as followings:

$$R(t)=\alpha \times RS(t)+(1 \times \alpha) \times R(t-1), \quad (5)$$

where $0<\alpha<1$ is a parameter that show a decay of correlation between two operation times of the procedure to be defined by steps S110-S190 shown in FIG. 5.

If a plurality of peak frequencies is detected, it is expected that there are a plurality of target objects whose number is equal to that of the peak frequencies. Thus, the directions of the target objects are obtained with respect to each of the upward modulated section and the downward modulated section. Those data including the peak frequencies and the directions of the target objects with respect to the upward modulated section and the downward modulated section will hereinafter be referred as to a first target direction information and a second target direction information, respectively.

In the present embodiment, the peak frequencies are obtained based on all $N \times M_{samp}$ pieces of sampled data of each of the first and second digital data. These $N \times M_{samp}$ pieces of sampled data are averaged over N channels, then $M_{samp}$ pieces of sampled data of each of the first and second digital data are used to obtain the peak frequencies.

Further, it is allowed to estimate the peak frequencies based on down-converted data obtained by subsampling the full $N \times M_{samp}$ pieces of sampled data of the first and second digital data.

Then the procedure proceeds to step S160.

At step S160, a pair matching process in which the first target direction information and the second target direction information are compared is executed. One of aims of performing the pair matching process is to extract multiple target objects. As a result of the pair matching process, pair data comprising a value from the first target direction information and the corresponding value from the second target direction information are provided.

In general, both the first and second digital data corresponding to the upward and downward modulated sections, respectively, include multiple intensity peaks, each intensity peak corresponding to beat frequencies, in the measuring frequency range. Each of those intensity peaks can be considered to indicate the presence of a target object. However, it is necessary to establish a pair of peak frequencies, one being extracted from the first digital data and another being extracted from the second digital data, to calculate the target object characteristic. If M intensity peaks are included in each of the first and second digital data, M×M pairs of beat frequencies are possible. Thus, the pair data has at most M×M pairs of peak frequencies.

At a subsequent step S170, the pair data are utilized to give distance of one of candidates target objects and relative speed of the candidates target objects.

If M intensity peaks are included in each of the first and second digital data, at most M×M distances to candidate target objects and M×M relative speeds of the candidate target objects are calculated. It can be considered that among M×M candidate target objects, (M−1)×M candidate target objects are artifacts which can not present in the real world. The artifacts would be identified at next step S180.

It is allowed that previously obtained direction information may have been stored in the memory of the signal processing unit 30 and can be referred to perform the pair matching process in which one of the peak frequencies in the first target direction information and the corresponding peak frequency in the second target direction information should be associated to identify one of the target objects. That is, it is preferable that the current first target direction information and the current second target direction information are stored in the memory of the signal processing unit 30 to be used in next time. Instead of the current first target direction information and the current second target direction information, all digital data $x_i(t)$ (i=1, . . . , N) corresponding to the peak frequencies with respect to all N channels and with respect to the upward modulated section and the downward modulated section can be stored. Further, it is allowed that the power spectrum of the beat signal obtained at step S120 are stored in the memory.

Then, at step S180, the distances of the target objects and the relative speeds of the target objects are determined based on the pair data calculated at step S170.

For example, all candidates for distances of the candidate target objects and relative speeds of the candidate target objects are examined in terms of consistency of the target objects' motions. That is, if some consistent physical tracks of candidates for the target objects can be traced, the candidates would be judged to be real target objects. In this case, it is necessary to refer target object characteristic including distance to the target objects and relative speed of the target objects at a time when the FMCW radar 2 has performed the detecting procedure defined by steps S110-S190 in FIG. 5.

Further, it is allowed that balances of intensities of peak frequencies which constitute each one of the pairs of the peak frequencies can be examined. A large imbalance in the intensities of the peak frequencies suggests that two peak frequencies are generated by different target objects.

Further, it is allowed that all candidates for distances of the candidate target objects and relative speeds of the candidate target objects are examined in terms of consistency with the first and second directional data obtained at step S150.

The determined distances of the target objects and the relative speeds of the target objects can be used for an auto-cruise operation, for a vehicle-navigating operation, or for controlling safety system installed in the vehicle.

Further, at step S180, the determined distances of the target objects and the relative speeds of the target objects are memorized in the memory of the signal processing unit 30 to be referred in the next detecting procedure.

If the determination at step S130 is "YES", that is, it is determined that some interference by some other radar is present. Then, the procedure proceeds to step S190.

At step S200, some measures are taken against the interference between the FMCW radar and some other radar.

For example, if target object detection is impossible, an alarm is given to a driver of the vehicle equipped with the FMCW radar 2. Some other measure will be taken against the interference between the FMCW radar and some other radar via a display indication or a sound alarm.

One of the aspects of the present embodiment provides a radar that is capable of detecting occurrence of interference between the radar and some other radar reliably, and measuring target characteristic such as presence of a target object within the measuring distance range of the radar system, distance between the radar system and the target object, and relative velocity of the target object to the radar system accurately, using amplitude changes in the beat signal over time.

Figure 6:
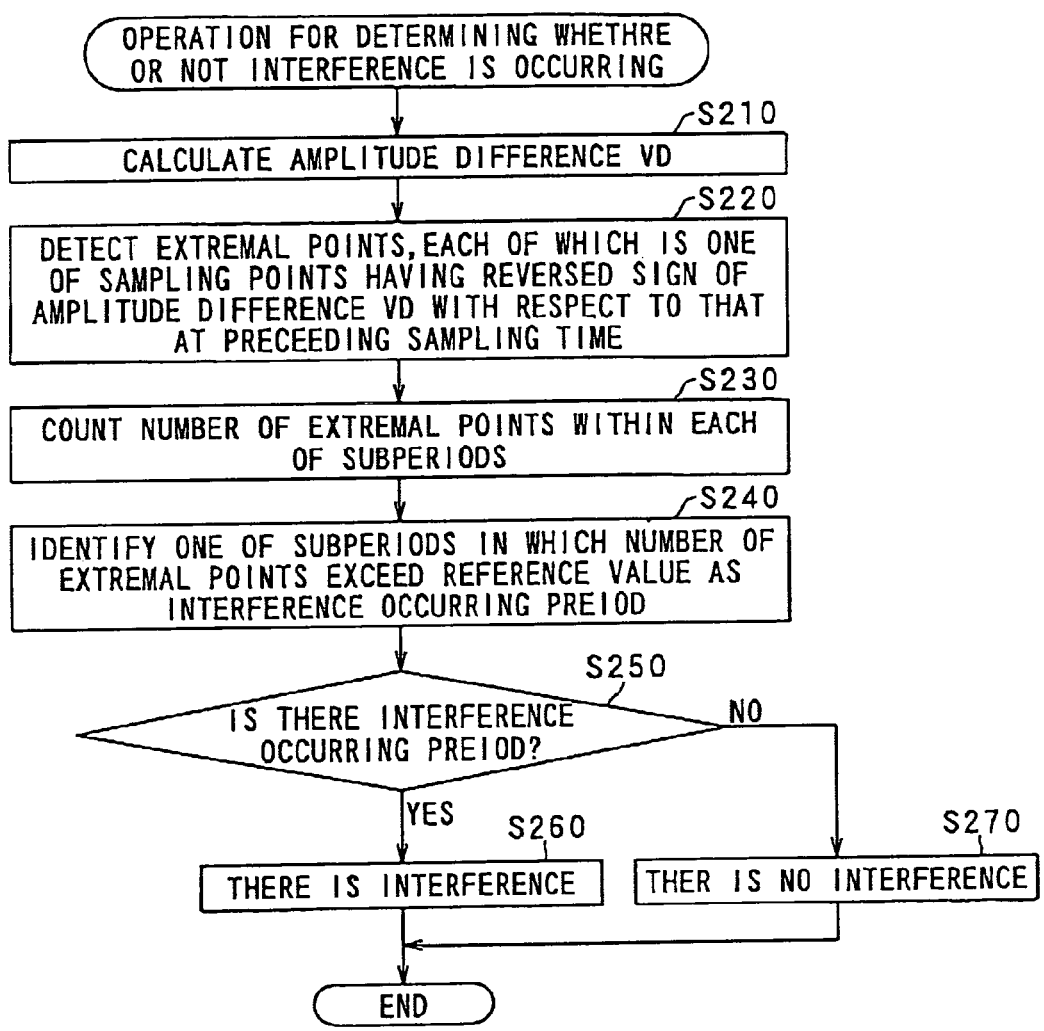
FIG. 6 is a flow chart showing a process for detecting occurrence of interference between the FMCW radar and some other radar based on periodicity of extremal points in an amplitude curve of the received signal or the beat signal according to the first embodiment of the present invention.

Referring to FIGS. 6-7D, more specific operations for determining whether or not interference occurs will be explained.

FIG. 6 is a flow chart showing a process for detecting occurrence of interference between the FMCW radar and some other radar based on periodicity of extremal points in an amplitude curve of the received signal or the beat signal. These operations are carried out in step S130 in FIG. 5.

Figure 7A:
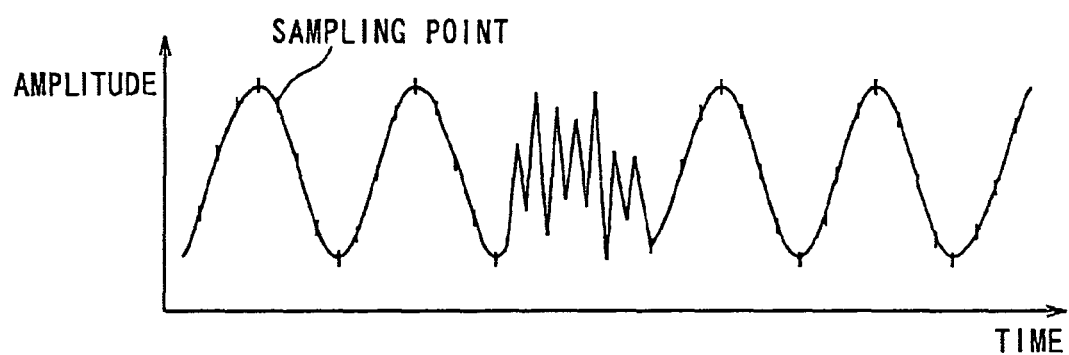
FIG. 7A is an explanatory diagram showing amplitude change of the beat signal over time over time and sampling points whose amplitudes of the beat signal are sampled by a signal processing unit shown in FIG. 1 at a predetermined interval.

FIG. 7A is an explanatory diagram showing the amplitude change of the received signal Sr or the beat signal B over time over time and sampling points whose amplitudes of the received signal Sr or the beat signal B are sampled at a predetermined interval. In this embodiment, the amplitude difference data is calculated from the beat signal.

At step S210, the signal processing unit 30 calculates amplitude differences VD between the digital data sampled at previous and current sampling moments to generate amplitude difference curve that shows changes in the amplitude differences VD over time.

FIG. 7B is an explanatory diagram showing the changes in the amplitude variation of the received signal or the beat signal over time. As shown in FIG. 7B, the differences VD can be a positive or negative value. If the amplitude of the beat signal is decreasing over time, a negative value of the difference VD would be calculated. In contrast to this, if the amplitude of the beat signal is increasing over time, a positive value of the difference VD would be calculated.

However, it is allowed that only 2 amplitude difference data are obtained by averaging 2×N amplitude difference data with respect to the channels.

Further, it is allowed that only one amplitude difference data is obtained by averaging 2×N amplitude difference data with respect to the frequency increasing section and the frequency decreasing section and with respect to the channels, or by selecting one of the 2×N amplitude difference data.

At subsequent step S220, extremal points in each of amplitude difference data are detected. One of the extremal points is defined as a moment when the signs of the amplitude difference data are changed. That is, for example, when the amplitude difference VD become negative if at the previous sampling time it was positive, the current sampling time is identified as an extremal point.

FIG. 7B is an explanatory diagram showing changes in the amplitude differences VD of the received signal or the beat signal over time.

FIG. 7C is an explanatory diagram showing extremal points at which the sign of the amplitude differences VD of the received signal or the beat signal is reversed.

As shown in FIG. 7B, the extremal points are positioned at one of the maximum points or the minimum points of time-dependent amplitude curve of the beat signal B.

It should be noted that in detecting the extremal points in the time-dependent amplitude curve of the received signal or the beat signal, only the signs of the amplitude difference data are referred to. In other words, only the result of determination of whether the amplitude difference is a positive value or a negative value at each of sampling points is used.

Then, the procedure proceeds to step S230.

At step S230, first, the predetermined detecting interval at which the loop operation defined by steps S110-S190 in FIG. 5 starts and repeats is divided into subperiods T1, T2, ..., each having unit period τ, as shown in FIG. 7B. Then, each number of the extremal points within each of subperiods is counted.

It is preferable that the unit period τ is slightly longer than the sweep time ΔT during which the frequency of the radar wave fs is linearly increased or decreased by the frequency modulation width ΔF. As a result of such the setting of the unit period τ, if an ideal case where no interference occurs and no large or long obstacles such as trucks and lorries, or large and long buildings such as a freeway bridge and its piers exist beyond the measuring distance range of the radar exist, one extremal point or two extremal points might fall into one of the subperiods.

In summary, at this step S230, an emerging pattern of the extremal points within each of periods of time is extracted to obtain a series of emerging patterns of the extremal points, sequentially in time.

FIG. 7D is an explanatory diagram showing changes in numbers of the extremal points within each of subperiods, each of subperiods having a unit period τ, and the numbers of the extremal points within one of the subperiods being examined.

At subsequent step S240, the numbers of the extremal points within every subperiods are compared with a reference number. That is, it is determined whether or not each of the numbers of the extremal points within each of the subperiods is allowable. If the numbers of the extremal points within the corresponding subperiods is smaller than the reference number, the number of the extremal points within the that subperiod is an allowable number. In contrast to this, i.e., if the number of the extremal points within one of the subperiods is larger than or equal to the reference number, the number of the extremal points within that subperiod is an abnormal number.

It is preferable that the reference number is defined as values exceeding an interference threshold number, as shown in FIG. 7D. It is possible to define the interference threshold number such that a predetermined variance is added to an average of the number of the extremal points within that subperiod.

If each of subperiods having a unit period τ contains, on the average, not a small number of the of the extremal points, a first reference number and a second reference number may be set at a numbers larger than and smaller than the average number of the extremal points, respectively. It is preferable that a first difference between the first reference number the average number equal to a second difference between the second reference number and the average number. In this case, if the numbers of the extremal points within one of the subperiods is smaller than the first reference number and larger than the second reference number, the number of the extremal points within the that subperiod is an allowable number. What if it is either larger than or equal to the first reference number or smaller than or equal to the second reference number, the number of the extremal points within that subperiod is an abnormal number.

In summary, at this step S240, a subperiod during which the emerging pattern of the extremal points is irregular among the series of the emerging patterns of the extremal points is detected.

Next, at step S250, it is determined in which subperiod the abnormal number of the extremal points is detected. The subperiod in which the number of the extremal points is not allowable might be referred to as an interference occurring period. If there is at least one of the interference occurring periods during which the number of the extremal points in the time-dependent amplitude curve of the received signal Sr and the beat signal B has a distance from the average number greater than a predetermined variance number, the procedure proceeds to step S260.

In contrast to this, if there is no subperiods during which the number of the extremal points, the procedure proceed to step S270.

In FIG. 7D, since each of subperiods having a unit period τ contains, on the average, only a small number of the of the extremal points, the first reference number can be used as an interference threshold number. Hence, within the subperiods T4 and T5, numbers of the extremal points exceeding the interference threshold number are detected. Thus, it is determined that interference between the FMCW radar 2 and some other radar occurs within the subperiods T4 and T5.

At step S260, it is concluded that interference between the FMCW radar 2 and some other radar occurs.

At step S270, it is concluded that no interference between the FMCW radar 2 and some other radar occurs.

Advantages of the Present Embodiment

As mentioned above, the method for detecting occurrence of interference between the FMCW radar 2 and some other radar according to the present embodiment includes steps of: calculating changes in the amplitude differences VD of the received signal or the beat signal over time, identifying extremal points in time-dependent amplitude curve of the received signal or the beat signal, counting each of numbers of the extremal points within each of subperiods, judging of whether or not each of the numbers of the extremal points within each of subperiods is normal, and determining some subperiod during which interference between the FMCW radar 2 and some other radar occurs based on a result of judgment of whether or not each of the numbers of the extremal points within each of subperiods is normal.

That is, in the method according to the present embodiment, only the numbers of the extremal points in the time-dependent amplitude curve of the beat signal B is utilized to determine whether or not interference between the FMCW radar 2 and some other radar occurs. This method uses a fact that in general, noise signal that is transmitted from the other radar and is superimposed on a return of radar wave has only either harmonic components higher than those of the radar wave or aperiodic components. Hence, even if level of the noise signal is low, it is possible to detect occurrence of interference. This means that only a small amount of computational power is required to perform the method according to the present embodiment.

Figure 8:
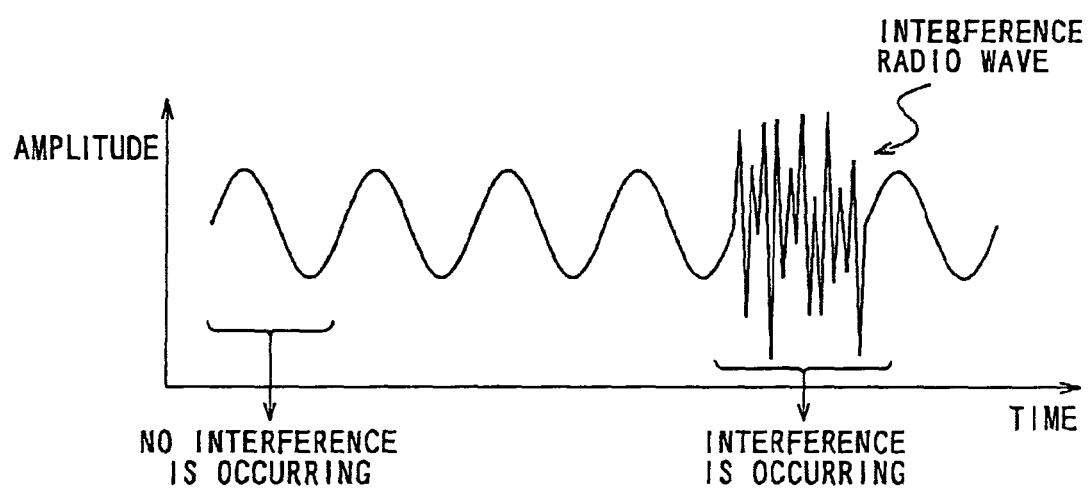
FIG. 8 is an explanatory diagram showing amplitude change of the received signal or the beat signal over time over time when the received signal or the beat signal is subjected to strong interference radio wave transmitted from some other radar.

FIG. 8 is an explanatory diagram showing amplitude change of the received signal or the beat signal over time over time when the received signal or the beat signal is subjected by strong interference radio wave transmitted from some other radar.

In this case, effect of interference on the received signal Sr or the beat signal B can be easily recognized because the effect of interference results in an amplified intensity variation in the received signal Sr or the beat signal B.

Figure 9:
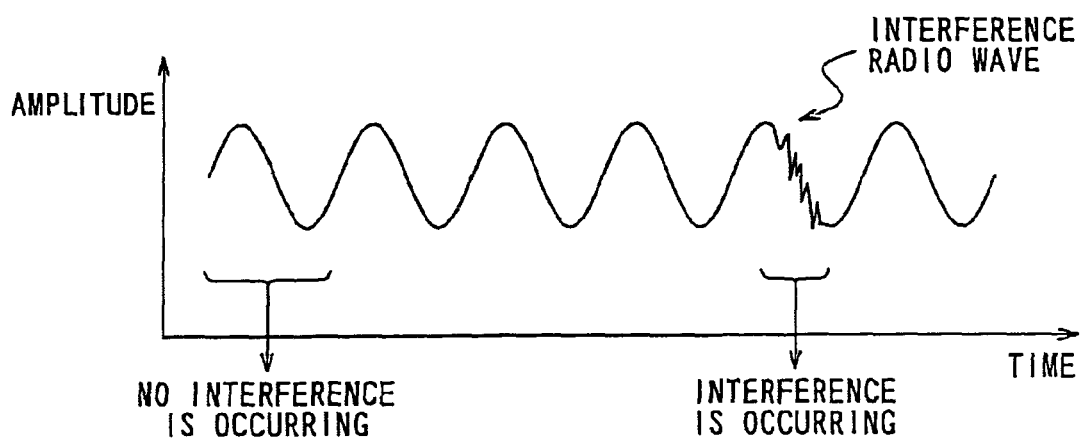
FIG. 9 is an explanatory diagram showing amplitude change of the received signal or the beat signal over time over time when the received signal or the beat signal is subjected by weak interference radio wave transmitted from some other radar.

FIG. 9 is an explanatory diagram showing amplitude change of the received signal or the beat signal over time over time when the received signal or the beat signal is subjected by weak interference radio wave transmitted from some other radar.

In this case, effect of interference on the received signal Sr or the beat signal B cannot be easily recognized when only amplitude changes in the received signal Sr or the beat signal B are observed, because the effect of interference does not result in an amplified intensity variation in the received signal Sr or the beat signal B.

However, in both case, extremal points in time-dependent amplitude curve of the received signal Sr or the beat signal B can be observed. Hence, it is possible to detect occurrence of interference even if level of an interference radio wave transmitted from some other radar is low.

Therefore, the radar 2 is capable of detecting occurrence of interference between the radar and some other radar reliably, even if some large or long target obstacles such as trucks and lorries, or large and long buildings such as a freeway bridge and its piers exist beyond the measuring distance range of the FMCW radar 2, and even if there are multiple target objects within the measuring distance range of the FMCW radar 2.

Further, as described above, when the direction of the target object located within the measuring distance range of the FMCW radar 2 is obtained from the self-correlation matrix R(t) that is defined by equation (5) and includes the digital signal data $x_i(t)$ (i=1, ..., N) obtained at current loop operation in FIG. 5 and the digital signal data $x_i(t-1)$ (i=1, ..., N) obtained at the previous loop operation, it is possible to determine the direction of the target object accurately because effect of interference on the digital signal data $x_i(t)$ and $x_i(t-1)$ (i=1, ..., N) can be removed by neglecting ones of the digital signal data $x_i(t)$ and $x_i(t-1)$ within the subperiods during which interference occurs.

Modification of the First Embodiment

In the method according to the first embodiment, it is determined that the number of the extremal points within each of the subperiods is abnormal if the number of the extremal points exceeds an interference threshold number, as shown in FIG. 7D. The interference threshold number is defined by adding a predetermined variance to an average of the number of the extremal points within one subperiod. However, it is allowed that the interference threshold number can be defined from the transmission signal Ss. More concretely, time dependent amplitude curve of the transmission signal Ss defines an ideal number of the extremal points within each of the subperiods, wherein the ideal number of the extremal points is defined as a number obtained in a situation where there is no other radar and there is no obstacles located beyond the measuring distance range of the FMCW radar 2.

So, it is possible to identify the ideal number of the extremal points as the average of the number of the extremal points within one subperiod.

Second Embodiment

Figure 10:
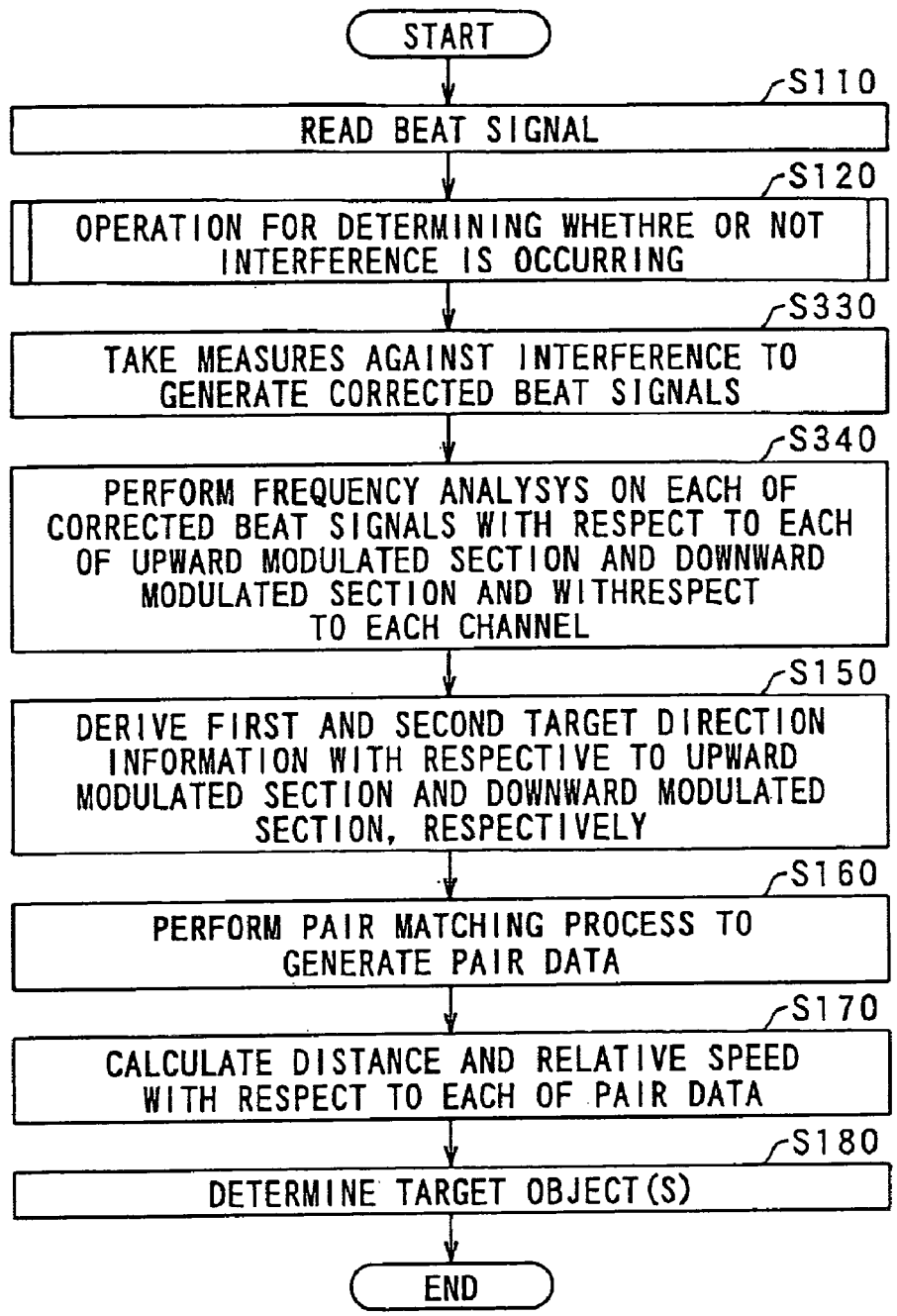
FIG. 10 is a flow chart showing a process for detecting the target object characteristic such as presence of a target object within a radar range of the radar, a distance between the target object and the radar, and a relative speed of the target object to the FMCW radar according to a second embodiment of the present invention, the process including steps of detecting occurrence of interference between the FMCW radar and some other radar based on periodicity of extremal points in an amplitude curve of received signal to which incident radio wave received by the FMCW radar is translated or the beat signal and removing events of interference from the received signal or the beat signal.
Figure 11:
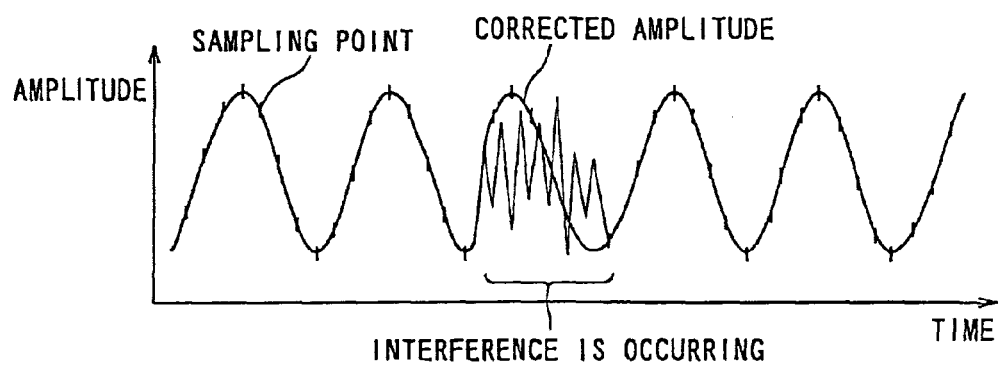
FIG. 11 is an explanatory diagram showing corrected amplitude change of the received signal or the beat signal over time over time after events of interference have been removed.

Referring to FIGS. 10-11, a second embodiment of the present invention will be explained.

FIG. 10 is a flow chart showing a process for detecting the target object characteristic such as presence of a target objet within a radar range of the radar, a distance between the target object and the radar, and a relative speed of the target object to the FMCW radar according to a second embodiment of the present invention, the process including steps of detecting occurrence of interference between the FMCW radar and some other radar based on periodicity of extremal points in an amplitude curve of received signal or the beat signal, and removing events of interference from the received signal.

Only different steps from ones shown in FIG. 5 can be found in steps S330 and S340. Therefore, only description about operations performed at steps S330 and S340 will be discussed.

In the process for detecting occurrence of interference between the FMCW radar 2 and some other radar according to the present embodiment, the digital data Db of the beat signal B is corrected by replacing the digital data Db of the beat signal B within subperiods during which interference occurs with a corrected sampled data which is obtained by sampling a harmonic curve having an period equal to twice the periodicity of the extremal points in order to form a smooth continuous interpolating curve in the extremal points, at step S330.

In such the manner, a corrected digital data Db of the beat signal B may be obtained. If this correcting operation is applied to both the first and second digital data, a corrected first digital data and a corrected second digital data which correspond to data in the frequency increasing section and in the frequency decreasing section are derived, respectively. These operations are carried out at step S340.

In the case where the received signal Sr is used to detect interference, the periodicity of the extremal points should be modulated as the frequency of the radar wave is modulated. That is, in a time section corresponding to the frequency increasing section of the radar wave, the periodicity of the extremal points in the amplitude curve of the received signal Sr should be decreased. In contrast to this, in a time section corresponding to the frequency decreasing section of the radar wave, the periodicity of the extremal points in the amplitude curve of the received signal Sr should be increased. These facts must be considered in estimating the smooth continuous interpolating curve in the extremal points.

FIG. 11 is an explanatory diagram showing corrected amplitude change of the received signal or the beat signal over time after events of interference have been removed.

At step S440, the signal processing unit 30 executes the frequency analysis, for example the fast Fourier transformation (FFT) analysis, for the first and second digital data of the beat signal corresponding to data in the frequency increasing section and in the frequency decreasing section, respectively According to the present embodiment, the same advantages with those of the previous embodiment can be obtained.

Further, there is provided a continuous wave radar, for example a FMCW radar, that accurately detects a target object characteristic including presence of a target object within a measuring range of the radar, a distance between the target object and the radar, and a relative speed of the target object to the radar, even if interference between the radar and some other radar occurs, because amplitude data about received signal or beat signal within subperiods during which interference occurs is replaced with a corrected data which is obtained based on a harmonic curve having an period equal to twice the periodicity of the extremal points.

What is claimed is:

1. A method used by a radar for detecting an occurrence of interference between a return of a radar wave which has been transmitted by the radar and has an oscillating amplitude in time and a radio wave transmitted by some other radar, comprising steps of:

detecting extremal points of an incident radio wave in which the radio wave transmitted by the other radar is superposed on the return of the radar wave, each of the extremal points being a moment at which either a maximum or a minimum in amplitude of the incident radio wave appears;

extracting, sequentially in time, an emerging pattern of the extremal points of the incident radio wave within each of periods of time to obtain a series of emerging patterns of the extremal points;

detecting a period during which the emerging pattern of the extremal points is irregular among the series of the emerging patterns of the extremal points; and determining if the interference has been detected as occurring within the detected period; wherein the emerging pattern is quantified by a number of the extremal points of the incident radio wave at a predetermined count period to determine a series of counted numbers of the extremal points of the incident radio wave, and the step of detecting the period during which the emerging pattern of the extremal points is irregular comprises:

averaging the counted numbers of the extremal points of the incident radio wave to determine an average number of the extremal points per counting period; and detecting the period during which a difference between the average number of the extremal points and one of the counted numbers of the extremal points of the incident radio wave within the one of the counting periods exceeds a predetermined threshold.

2. The method according to claim 1, further comprising:

generating a first beat signal and a second beat signal by mixing the incident radio wave received by the radar and the radar wave transmitted from the radar in an upward modulated section and in a downward modulated section, respectively, wherein the radar is a frequency modulated continuous wave (FMCW) radar that transmits a frequency-modulated radar wave whose frequency changes in time, the radar wave having the upward modulated section during which the frequency of the radar wave increase in time and the downward modulated section during which the frequency of the radar wave decrease in time, and at least one of the first and second signals is used to calculate a histogram of intensities of frequency components of the beat signal.

3. A frequency modulated continuous wave (FMCW) radar that detects a target object characteristic including at least one of a presence of a target object within a measuring range of the radar, a distance between the target object and the radar, and a relative speed of the target object with respect to the radar, the radar comprising:

a transmission signal generator generating a transmission signal whose frequency is modulated so as to have an upward modulated section during which the frequency of the transmission signal increase in time and a downward modulated section during which the frequency of the transmission signal decrease in time;

a transmission antenna transmitting the transmission signal as a radar wave in a direction of the measuring range, the farthest distance of the measuring range corresponding to a maximum measurement frequency;

a reception antenna unit receiving an incident radio wave including a return of the radar wave from the target object located within the measuring range of the radar so as to generate a received signal based on the incident radio wave;

a beat signal generator generating a first and a second beat signal with respect to each of the upward modulated section and the downward modulated section, respectively, based on both the transmission signal and the received signal;

an extremal point detector detecting extremal points of an incident radio wave in which the radio wave transmitted by the other radar is superposed on the return of the radar wave, each of the extremal points being a moment at which either a maximum or a minimum in amplitude of the incident radio wave appears;

an extracting unit extracting an emerging pattern of the extremal points of the incident radio wave within each of periods of time to obtain a series of emerging patterns of the extremal points;

a detector detecting a period during which the emerging pattern of the extremal points is irregular among the series of the emerging patterns of the extremal points;

an interference determining unit determining if the interference occurs during the detected period of time;

a frequency analyzer performing frequency analysis on the first and second beat signals to obtain a first and a second frequency spectrum characteristic thereof which show distribution of intensities of the beat signal in frequency domain with respect to the upward modulated section and the downward modulated section, respectively;

a peak frequency detector detecting a first and second peak frequencies which has respective highest intensities in the first and second frequency spectrum characteristic, respectively if the first and second peak frequencies are below the maximum measurement frequency; and a target object characteristic calculator calculating the target object characteristic based on the first and second peak frequencies; wherein the emerging pattern is quantified by a number of the extremal points of the incident radio wave at a predetermined counting period to determine a series of counted numbers of the extremal points of the incident radio wave, and the interference determining unit comprises:

an average calculator averaging the counted numbers of the extremal points of the incident radio wave to determine an average number of the extremal points per counting period;

a period detector detecting the period during which a difference between the average number of the extremal points and one of the counted numbers of the extremal points of the incident radio wave within the one of the counting periods exceeds a predetermined threshold.

4. The radar according to claim 3, wherein the extremal point detector comprises:

a sampling unit time-sequentially sampling amplitudes of the first and second beat signals at sampling times to generate changes in amplitudes of the first and second beat signals, respectively;

a difference calculator calculating changes in amplitudes of the first and second beat signals to generate changes in difference of the amplitudes of the first and second beat signals, respectively, in time; and a detector detecting one of the sampling times at which signs of the difference of the amplitudes of the first and second beat signals are reversed with respect to those at a preceeding one of the sampling times as one of the extremal points.

5. The radar according to claim 3, wherein
the extremal point detector detects extremal points of at least one of the first and second beat signals, each of the extremal points being a moment at which either a maximum or a minimum in amplitude of at least one of the first and second beat signals appears, and the extracting unit extracts, sequentially in time, emerging patterns of the extremal points of at least one of the first and second beat signals within each of periods.

6. The radar according to claim 3, wherein
the extremal point detector detects extremal points of at least one of the first and second beat signals, each of the extremal points being a moment at which either a maximum or a minimum in amplitude of at least one of the first and second beat signals appears, the extracting unit extracts, sequentially in time, emerging patterns of the extremal points of at least one of the first and second beat signals within each of periods.

7. The radar according to claim 4, wherein
the extremal point detector detects extremal points of at least one of the first and second beat signals, each of the extremal points being a moment at which either a maximum or a minimum in amplitude of at least one of the first and second beat signals appears, and the extracting unit extracts, sequentially in time, emerging patterns of the extremal points of at least one of the first and second beat signals within each of periods.

8. The radar according to claim 3, wherein
the radar is a vehicle-mounted radar.

* * * * *